(12) United States Patent
Pavlik

(10) Patent No.: US 11,046,267 B2
(45) Date of Patent: Jun. 29, 2021

(54) SECONDARY BUMPER ASSEMBLIES FOR VEHICLES

(71) Applicant: JPAV Corporation, Rochester Hills, MI (US)

(72) Inventor: Joseph Pavlik, Rochester Hills, MI (US)

(73) Assignee: JPAV Corporation, Rochester Hills, MI (US)

( * ) Notice: Subject to any disclaimer, the term of this patent is extended or adjusted under 35 U.S.C. 154(b) by 190 days.

(21) Appl. No.: 16/280,095

(22) Filed: Feb. 20, 2019

(65) Prior Publication Data

US 2019/0291669 A1    Sep. 26, 2019

Related U.S. Application Data

(60) Provisional application No. 62/647,015, filed on Mar. 23, 2018.

(51) Int. Cl.
*B60R 19/18* (2006.01)
*B60R 19/44* (2006.01)
*B60R 19/24* (2006.01)

(52) U.S. Cl.
CPC .............. *B60R 19/18* (2013.01); *B60R 19/24* (2013.01); *B60R 19/44* (2013.01)

(58) Field of Classification Search
CPC ......... B60R 19/44; B60R 19/18; B60R 19/50; B60R 2019/1886; B60R 19/24; B60R 19/48; B60R 13/105; B60R 19/12
USPC ....... 293/142, 103, 120, 155, 117, 132, 115, 293/128, 153, 148, 137; 296/187.29, 296/136.02, 180.1, 187.04, 187.11, 204, 296/199; 224/309, 405, 493, 550, 551, 224/585
See application file for complete search history.

(56) References Cited

U.S. PATENT DOCUMENTS

| | | | |
|---|---|---|---|
| 1,633,054 | A | 6/1927 | Wililamson et al. |
| 1,896,277 | A | 2/1933 | Barry |
| 2,797,121 | A | 6/1957 | Aud |
| 2,959,146 | A | 11/1960 | Eckert |
| 3,563,595 | A | 2/1971 | Slavney |
| 3,610,609 | A * | 10/1971 | Sobel ..................... B60R 19/32 267/140 |

(Continued)

*Primary Examiner* — D Glenn Dayoan
*Assistant Examiner* — Sunsurraye Westbrook
(74) *Attorney, Agent, or Firm* — Harness, Dickey & Pierce, P.L.C.

(57) ABSTRACT

A secondary bumper assembly is provided and includes a base plate, a secondary bumper, and heel blocks. The base plate includes holes for mounting the secondary bumper assembly to a primary bumper. The secondary bumper is disposed on the base plate. The secondary bumper includes a main body and a base. First and second grooves exist between portions of the main body and the base, which has base segments. The heel blocks include flanges and maintain contact between or at least partially prevent movement between the secondary bumper and the base plate. The base segments slide into gaps between the base plate and the heel blocks. A hardness level of the base segments is greater than a predetermined level to prevent flexing of the base segments in a direction away from portions of the main body opposite the base segments. The flanges slide respectively into the first and second grooves.

32 Claims, 26 Drawing Sheets

(56) References Cited

U.S. PATENT DOCUMENTS

| | | | |
|---|---|---|---|
| 3,645,575 A * | 2/1972 | Slavney | B60R 19/44 |
| | | | 293/143 |
| 4,061,385 A * | 12/1977 | Schwartzberg | B60R 19/20 |
| | | | 293/107 |
| 4,620,736 A | 11/1986 | Shanks | |
| 5,560,662 A * | 10/1996 | Apgar, Jr. | B60R 19/18 |
| | | | 293/108 |
| 7,163,244 B2 | 1/2007 | Meltzer | |
| 7,611,176 B2 | 11/2009 | Arnt | |
| 7,810,857 B2 | 10/2010 | Schutt | |
| 9,752,291 B2 | 9/2017 | Michael et al. | |
| 10,759,641 B1 * | 9/2020 | Whetstine | B66F 9/12 |
| 2014/0225389 A1 | 8/2014 | Epling | |

* cited by examiner

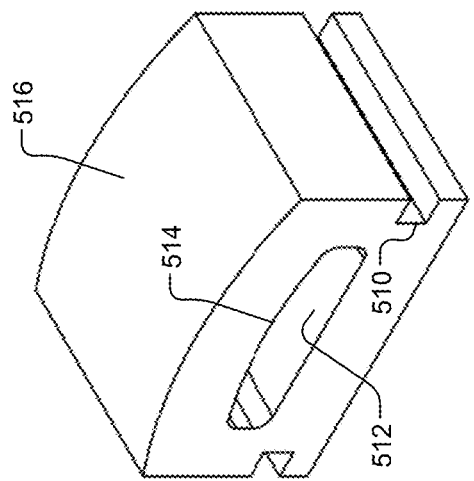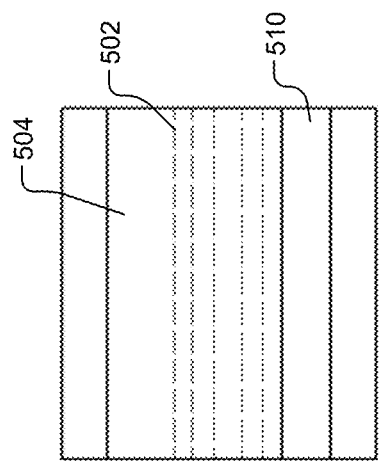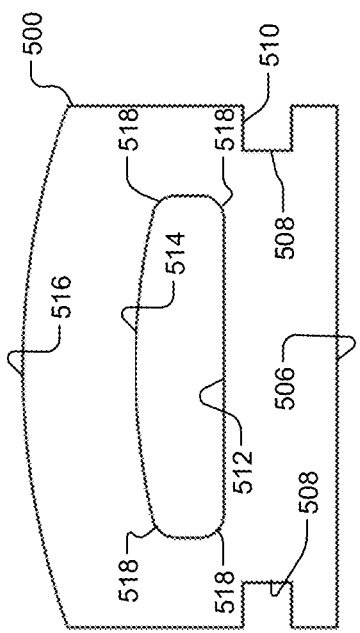

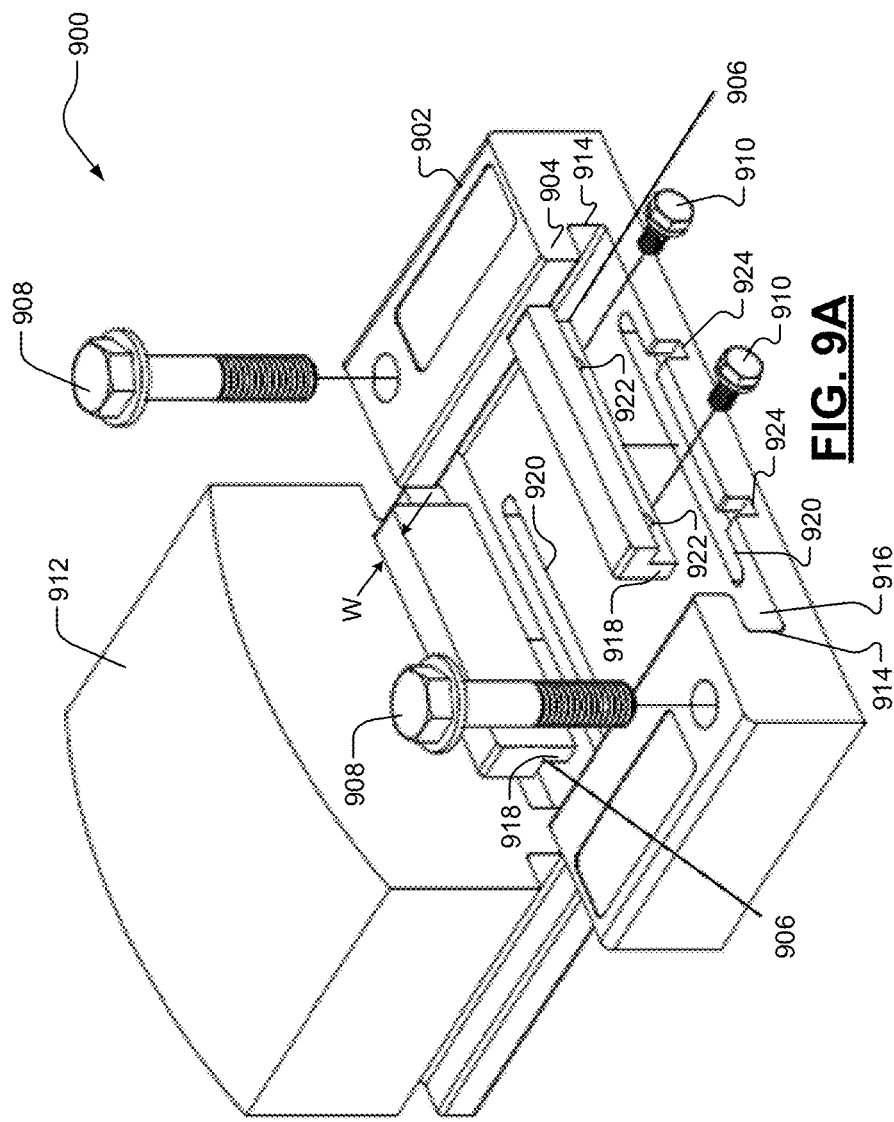

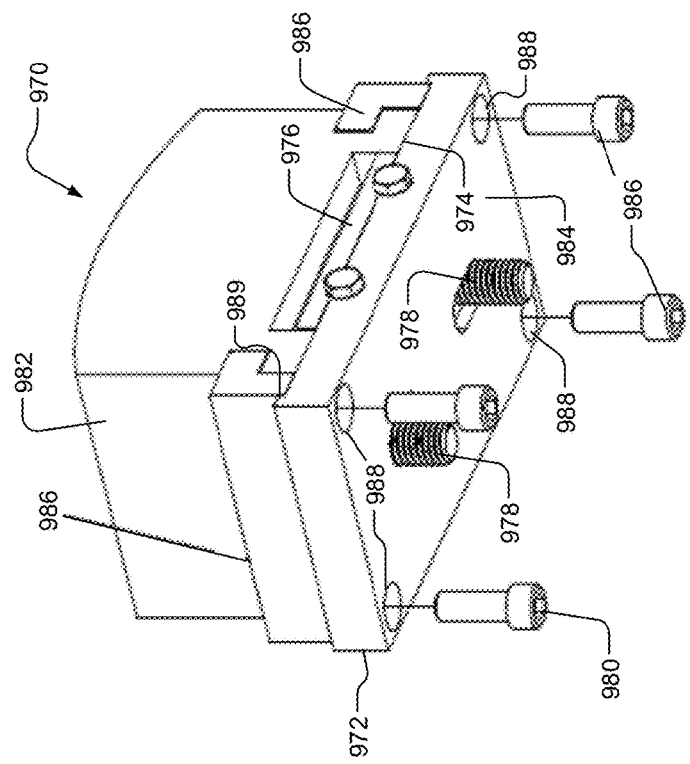
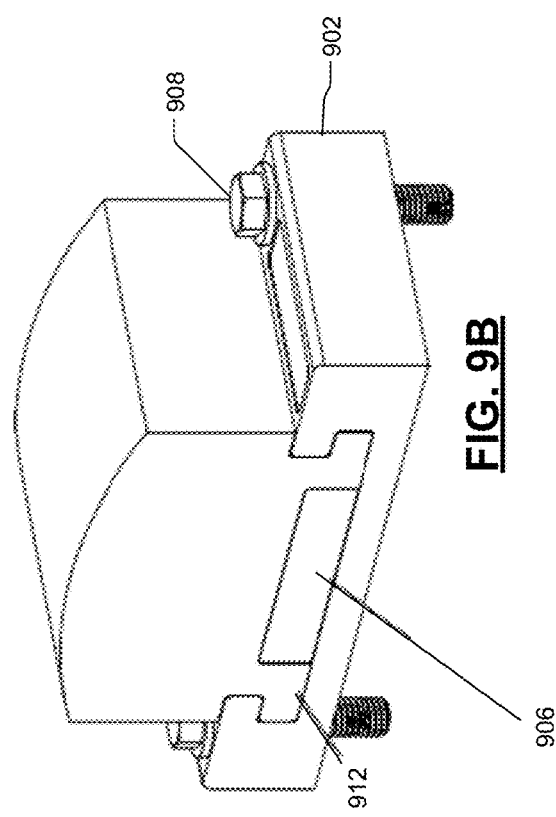
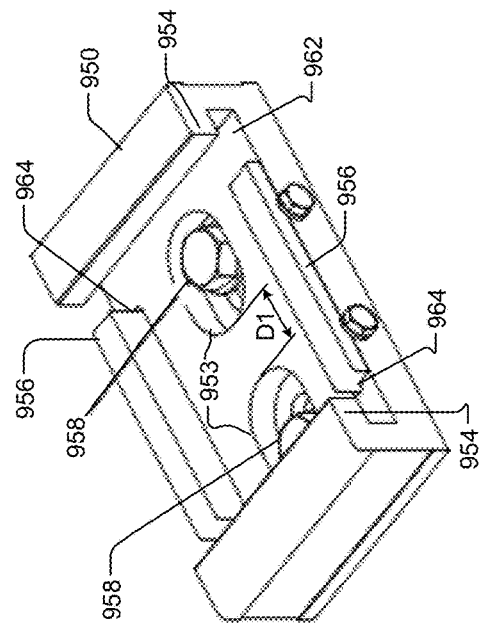

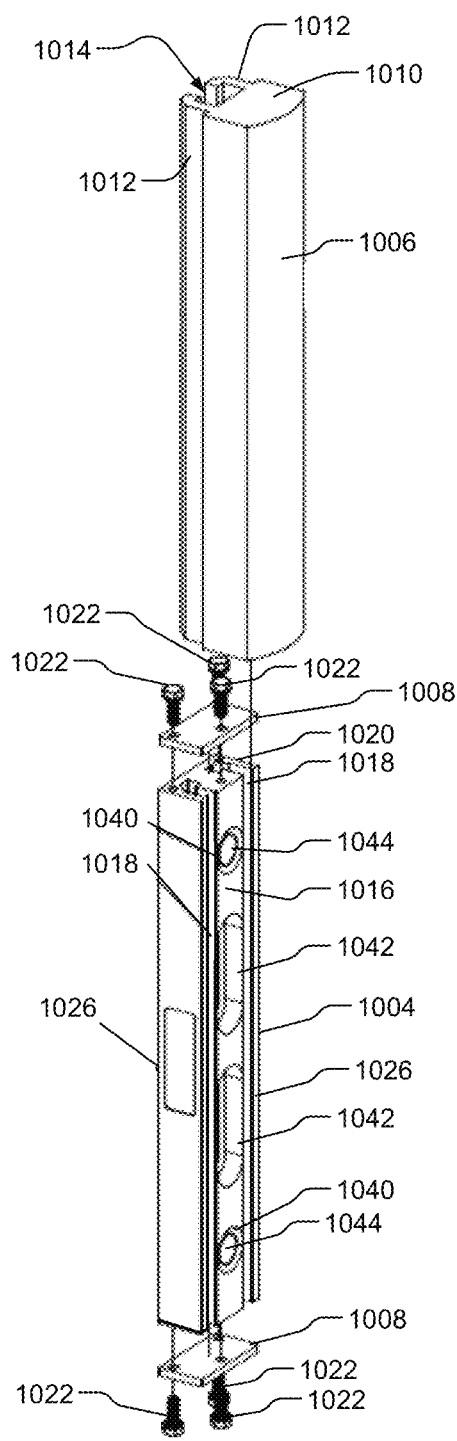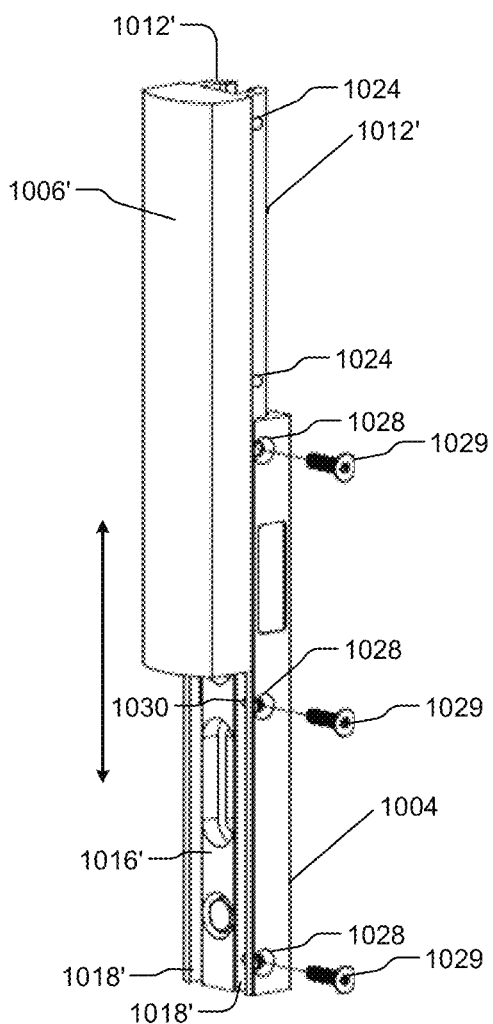
FIG. 10B
FIG. 10C

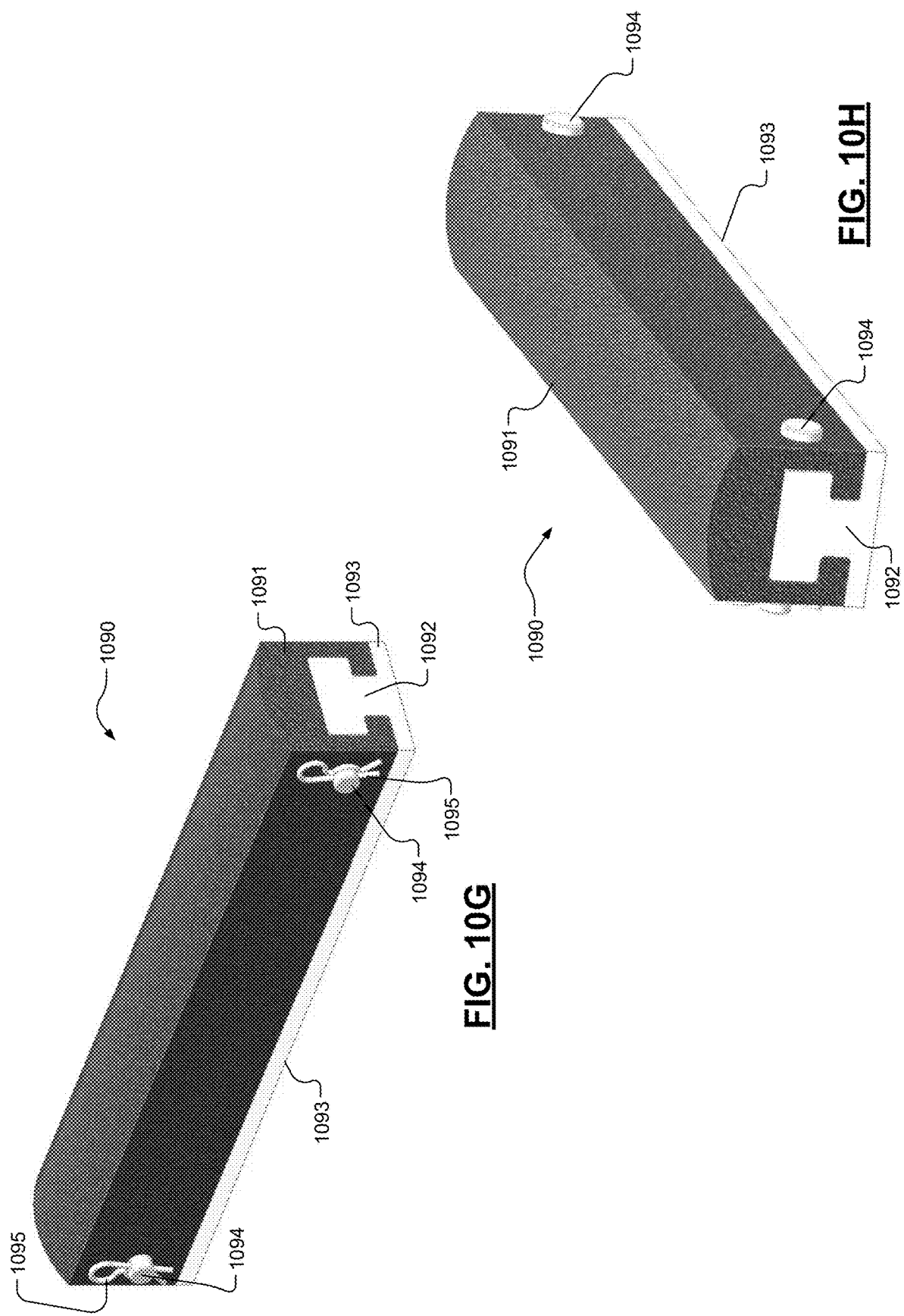

SECONDARY BUMPER ASSEMBLIES FOR VEHICLES

CROSS-REFERENCE TO RELATED APPLICATIONS

This application claims the benefit of U.S. Provisional Application No. 62/647,015, filed on Mar. 23, 2018. The entire disclosure of the application referenced above is incorporated herein by reference.

FIELD

The present disclosure relates to bumpers for trucks, trailers, and/or other vehicles configured to dock at loading bays for payload transfer.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Goods are transported via ground transportation across the country between facilities of various manufacturers, suppliers, and retailers. Trucks (e.g., class 8 or higher trucks), trailers and/or other vehicles are used to haul the goods between shipping and receiving loading docks (or loading bays) of the facilities. In order to minimize a gap between the back of a vehicle and a loading dock, a driver often hits the loading dock with the back of the vehicle. This can cause damage to the back of the truck and the loading dock.

A vehicle typically includes a primary bumper, often made of steel or aluminum, which extends along the back of the vehicle to minimize damage to the vehicle in the event of a collision. Vehicles are also often equipped with secondary bumpers, which are used to minimize damage to loading docks, the primary bumpers and/or other portions of the vehicles as a result of repetitively backing into a loading dock. The secondary bumpers are typically mounted on the primary bumpers and may be composed of rubber polymers. The secondary bumpers are periodically replaced due to wear caused by the impact and friction experienced during each loading and unloading process when the vehicle hits a loading dock.

The rubber of the secondary bumpers absorbs impacts, but is limited in its ability to absorb and handle high friction and abrasion experienced during loading and unloading processes. During loading and unloading, forklifts are occasionally used to move pallets of goods on and off of vehicles. During this process, the secondary bumpers can be destroyed within a few months of use. This can occur, due to a payload weighing down a vehicle during loading, causing the rear of the vehicle to be closer to the ground, which can bind the secondary bumpers against the loading dock.

Certain secondary bumpers are composed entirely of ultra-high molecular weight (UHMW) polyethylene, which aids in protecting against shredding, but is limited in its ability to be compressed. Yet other bumpers are formed of a combination of rubber and UHMW polyethylene. This style bumper may include two layers. The first layer is in contact with the vehicle and is formed of a compressible rubber. The second layer is formed of UHMW polyethylene and is disposed on the first layer. The second layer is arranged to contact a loading dock.

Each of the above-described secondary bumpers typically includes two recessed mounting holes that extend horizontally through the bumpers. Two bolts are inserted into each of the secondary bumpers, such that heads of the bolts are recessed in the secondary bumpers and threaded portions of the bolts are screwed into a primary bumper or rear mounting plate of the vehicle. Vehicles rarely bump against a loading dock in a perpendicular direction, such that the primary bumper of the vehicle is parallel to a loading dock and two secondary bumpers hit the loading dock at the same time. As a result, a vehicle rarely bumps against a loading dock true to a flat opposing surface of a secondary bumper. For this reason, the secondary bumpers tend to wear down quickly to a point where the heads of the bolts end up hitting the loading docks and causing damage to the primary bumpers, mounting structures of the secondary bumpers and the loading docks.

SUMMARY

A secondary bumper assembly is provided and includes a base plate, a secondary bumper, and a first pair of heel blocks. The base plate includes holes for mounting the secondary bumper assembly to a primary bumper of a vehicle. The secondary bumper is disposed on the base plate. The secondary bumper includes a main body and a base. A first groove and a second groove exist between portions of the main body and the base. The base has base segments. The first pair of heel blocks includes flanges and are configured to at least one of maintain contact between or at least partially prevent movement between the secondary bumper and the base plate. The base segments slide into gaps between the first pair of heel blocks and the base plate. A hardness level of the base segments is greater than a predetermined level to prevent flexing of the base segments in a direction away from portions of the main body opposite the base segments. The flanges slide respectively into the first groove and the second groove.

In other features, a secondary bumper assembly is provided and includes a secondary bumper and a base plate. The secondary bumper includes a main body and members. The members extend from the main body and form a first channel. A base plate includes holes for mounting the secondary bumper assembly to a primary bumper of a vehicle. The baseplate includes a center member and a bottom retainer plate. The center member extends longitudinally along the bottom retainer plate and interlocks with the members. The secondary bumper slides over the center member, such that the center member is disposed in the first channel.

In other features, a secondary bumper assembly is provided and includes a base plate, a secondary bumper, at least one of a band or a plurality of plates, and a plurality of fasteners. The base plate includes holes for mounting the secondary bumper assembly to a primary bumper of a vehicle. The secondary bumper is disposed on the base plate. The band extends around a portion of the secondary bumper. The plates extend from the base plate and into the secondary bumper. The fasteners extend though the secondary bumper and at least one of the band or the plates.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5A is a side view of another secondary bumper having a pass-through side interior pocket in accordance with an embodiment of the present disclosure;

FIG. 5B is another side view of the secondary bumper of FIG. 5A;

FIG. 5C is a perspective view of the secondary bumper of FIG. 5A;

FIG. 9A is a top perspective view of another secondary bumper assembly including a base plate with integrated bumper groove flanges, trapping heel blocks and cross disposed mounting holes in accordance with an embodiment of the present disclosure;

FIG. 9B is a top perspective view of the secondary bumper assembly of FIG. 9A;

FIG. 9C is a side perspective view of a base plate including counterbored centrally located mounting holes and integrated bumper groove flanges in accordance of an embodiment of the present disclosure;

FIG. 9D is a bottom perspective view of another secondary bumper assembly including a base plate with a heel block pocket, trapping heel blocks and counterbored centrally located holes in accordance with an embodiment of the present disclosure;

FIG. 10B is a perspective view of one of the secondary bumper assemblies of FIG. 10A;

FIG. 10C is another perspective view of one of the secondary bumper assemblies of FIG. 10A;

FIG. 10G is a perspective view of another secondary bumper assembly including a straight Gib style secondary bumper and clevis and cotter pins in accordance with an embodiment of the present disclosure;

FIG. 10H is another perspective view of the secondary bumper assembly of FIG. 10G;

In the drawings, reference numbers may be reused to identify similar and/or identical elements.

DETAILED DESCRIPTION

Secondary bumper assemblies are set forth below that eliminate the horizontal mounting holes of traditional secondary bumpers and include secondary bumpers configured to not be susceptible to shredding and are compressible. The disclosed secondary bumpers have increased service life over traditional secondary bumpers and are able to endure abrasion-prone loading and unloading processes including absorbing corresponding impact between vehicles and loading docks.

Various examples are shown in the figures of this application and described below. Although each figure shows certain features, each embodiment of this application may include one or more features shown in one or more of the figures.

Figure 1A:
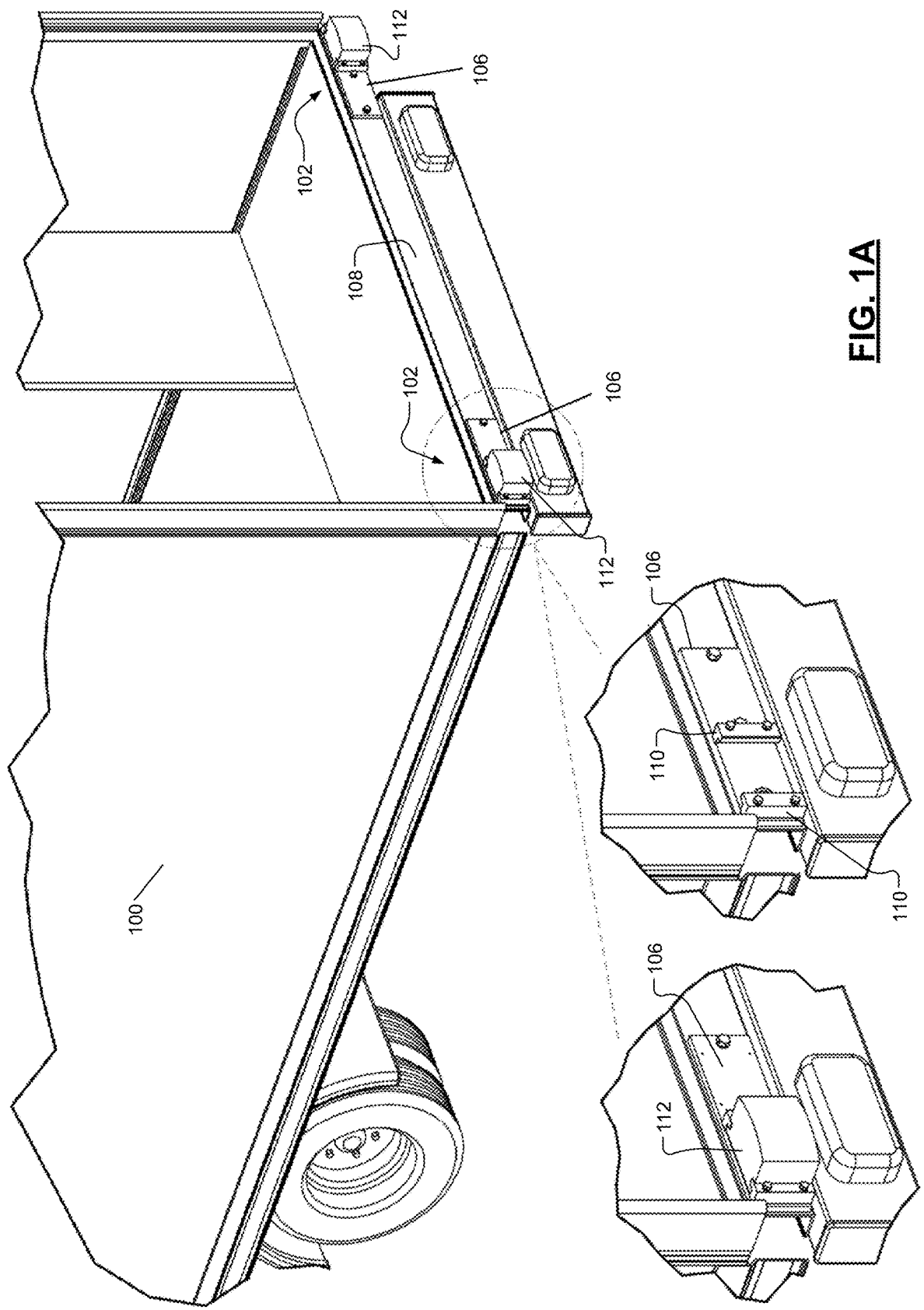
FIG. 1A includes perspective views of a rear portion of a vehicle including secondary bumper assemblies in accordance with an embodiment of the present disclosure.
Figure 1B:
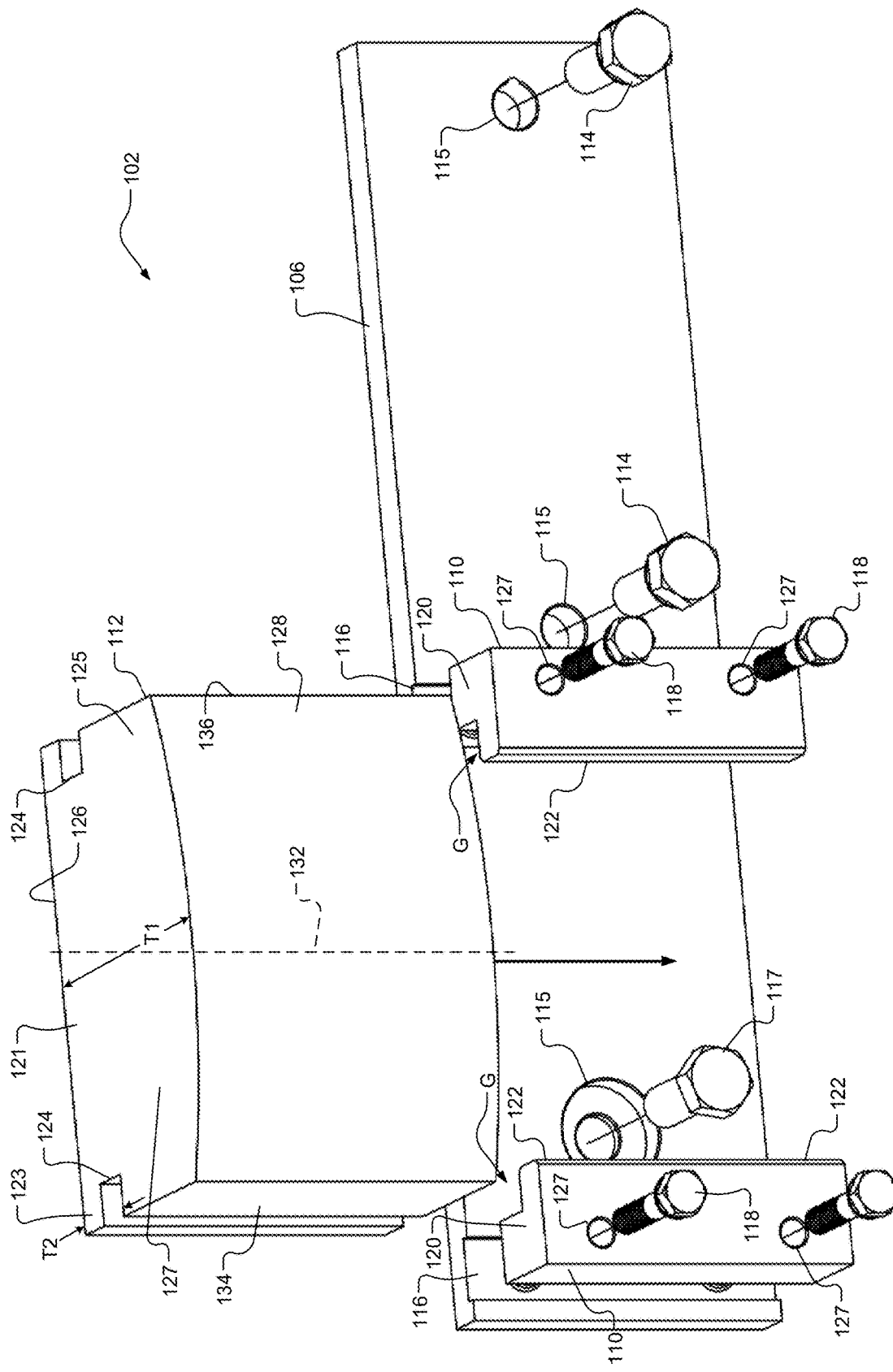
FIG. 1B is an exploded perspective view of one of the secondary bumper assemblies of FIG. 1A.
Figure 1C:
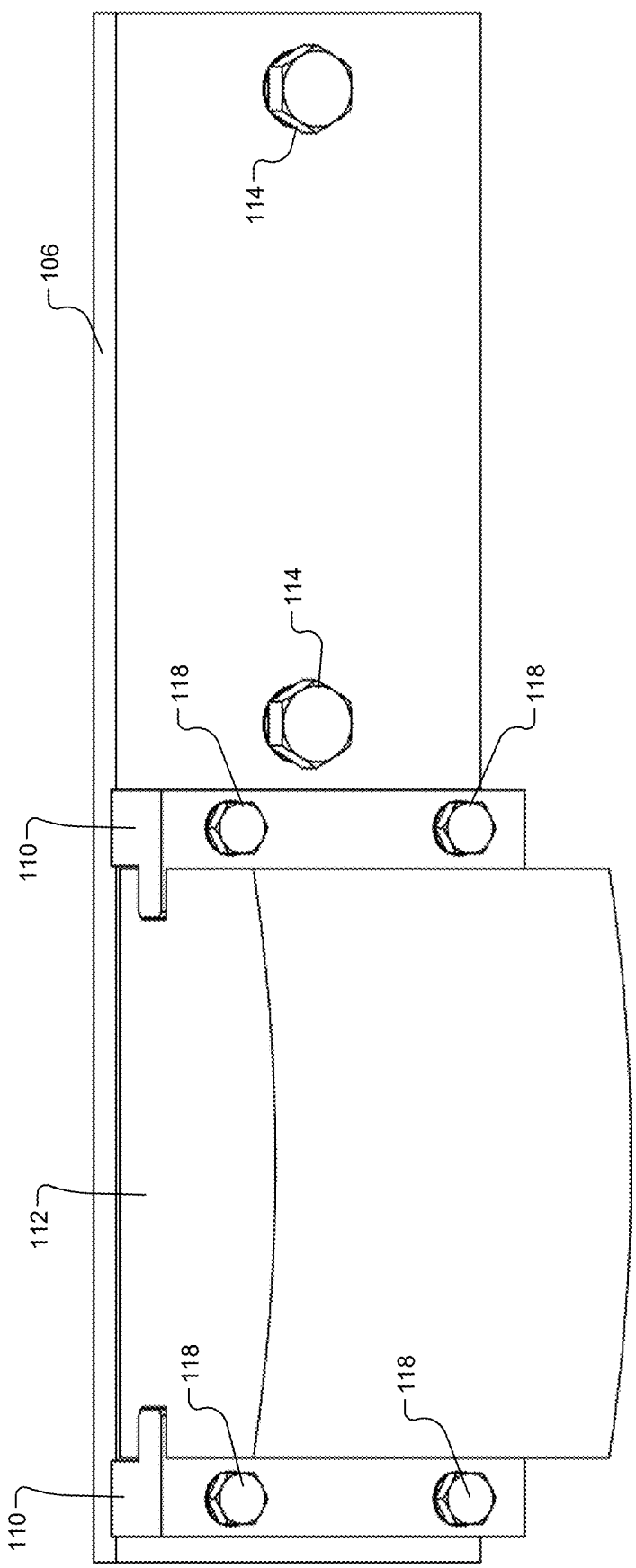
FIG. 1C is a front perspective view of one of the secondary bumper assemblies of FIG. 1A.

FIGS. 1A-C show a rear portion 100 of a vehicle including secondary bumper assemblies 102. Each of the secondary bumper assemblies 102 includes: a based plate 106; mounted to a primary bumper (or rear mounting plate) 108 of the vehicle; groove hold-down heel blocks (sometimes referred to as clamps) 110; and bumpers 112. The base plate 106 is fastened to the primary bumper 108 via first fasteners 114. Any of the fasteners, such as screws, bolts or pins, disclosed herein may include washers, except those in which the holes are sized to match sizes of heads of the fasteners (see, for example, FIGS. 8A, 8B, 9D, 11B). The first fasteners 114 may be bolts that extend through first holes 115 in the base plate 106 and are either screwed into the primary bumper 108 or extend through the primary bumper 108. Nuts may be turned onto threaded portions of the first fasteners 114 on a side of the primary bumper 108 opposite the secondary bumper assembly 102. One of the holes 115 may have a recessed portion, such that a head 117 of a corresponding fastener is recessed in the hole 115 when the base plate 106 is fastened to the primary bumper 108. This allows the secondary bumper block to be slid onto the base plate 106 without hitting the head 117.

The groove hold-down heel blocks 110 may be 'L'-shaped and be disposed in respective grooves 116 of the base plate 106 and fastened to the base plate 106 via second fasteners 118. Each of the groove hold-down heel blocks 110 includes a main body 120 that engages with the grooves 116 and a flange 122 that extends laterally from the main body 120 and is disposed in grooves 124 of the secondary bumpers 112 when the secondary bumpers 112 are clamped onto the base plates 106 via the groove hold-down heel blocks 110. In an embodiment, the flange 122 extends perpendicular to the main body 120. The second fasteners 118 may be threaded bolts that extend through holes 127 in the groove hold-down heel blocks 110 and are screwed into the base plate 106.

The secondary bumpers 112 include the grooves 124 near first sides 126 that are opposite second sides (or bumping surfaces) 128. The second sides 128 may be arched (or semi-circular), where a thickness T1 (or depth) of the secondary bumpers are largest along vertical centerlines 132 between left and right sides 134, 136 of the secondary bumpers 112. The maximum thickness T1 is show in FIG. 1D. The arched second sides 128 aid in increasing life of the secondary bumpers 112 by minimizing wear when the secondary bumpers hit loading docks at different angles. The secondary bumpers 112 include a base 121 with base (or mounting) segments 123, which are on opposite sides of the grooves 124 then tapered ends 125 of a main body 127. The base segments 123 are squeezed when the groove hold-down heel blocks 110 are tightly fastened to the base plates 106.

The secondary bumpers 112 do not include mounting holes, which improves life of the secondary bumpers. The secondary bumpers 112 have increased life since there are no open holes to wear out and no bolt protrusions as the material of the secondary bumpers 112 wears. The secondary bumpers also have a thick durable main body, where the thickness T1 is greater than a predetermined thickness to provide a predetermined amount of dampening a response during a bump event. In an embodiment, the secondary bumpers 112 are formed of ethylene propylene diene monomer (EPDM) rubber. The secondary bumpers 112 may be formed of one or more other suitable materials or combinations of materials, such as one or more of EPDM rubber, a rubber polymer, thermoplastic elastomers (TPE), UHMW polyethylene, etc. In an embodiment, the secondary bumpers 112 are formed of EPDM rubber having an 80-85 shore hardness level. The secondary bumpers 112 are easily replaced with a minimum amount of tools. The hardness level of the material of the secondary bumpers 112 is above a predetermined level and the thickness T2 is greater than a predetermined amount, which causes the base segments 123 to be rigid. As a result, the base segments 123, in order to be disposed between the flanges 122 and the base plate 106, are slid along the flanges 122 into gaps G between the heel blocks 110 and the base plate 106. The base segments 123 are not flexible enough and the thickness T2 is not thin enough to be flexed and angled into the spaces between the flanges 122 and the base plate 106. The base segments 123 are unable to be flexed in a direction away from portions of the main body 127 on opposite sides of the grooves 124 than the base segments 123. This provides a significant rigid clamping structure for holding and maintaining placement of the secondary bumpers 112 during bump events.

When mounting the secondary bumper assembly 102 a first time on a vehicle, the following procedure may be applied. The corresponding base plate (e.g., base plate 106) is mounted to a primary bumper 108. A drill template may be used to drill and tap holes in the primary bumper 108 for the base plate. The base plate may be fastened to the primary bumper 108 using stainless steel bolts and/or other fasteners. If the primary bumper 108 is made of wood and/or there is wood on an opposite side of the primary bumper 108 than the base plate, then lag bolts may be used to mount the secondary bumper assembly 102 to the primary bumper 108. Groove hold-down heel blocks are then mounted to the base plate 106 via second fasteners 118. A secondary bumper 112 is slid on the base plate, such that flanges 122 of the groove hold-down heel blocks 110 extend into grooves 124 in the secondary bumper 112. The secondary bumper 112 is slid on the base plate until sides of the secondary bumper 112 are flush with sides of the base plate 106. The second fasteners 118 are then tightened to a predetermined torque setting to squeeze base (or mounting) segments 123 of the secondary bumper 112.

Figure 1D:
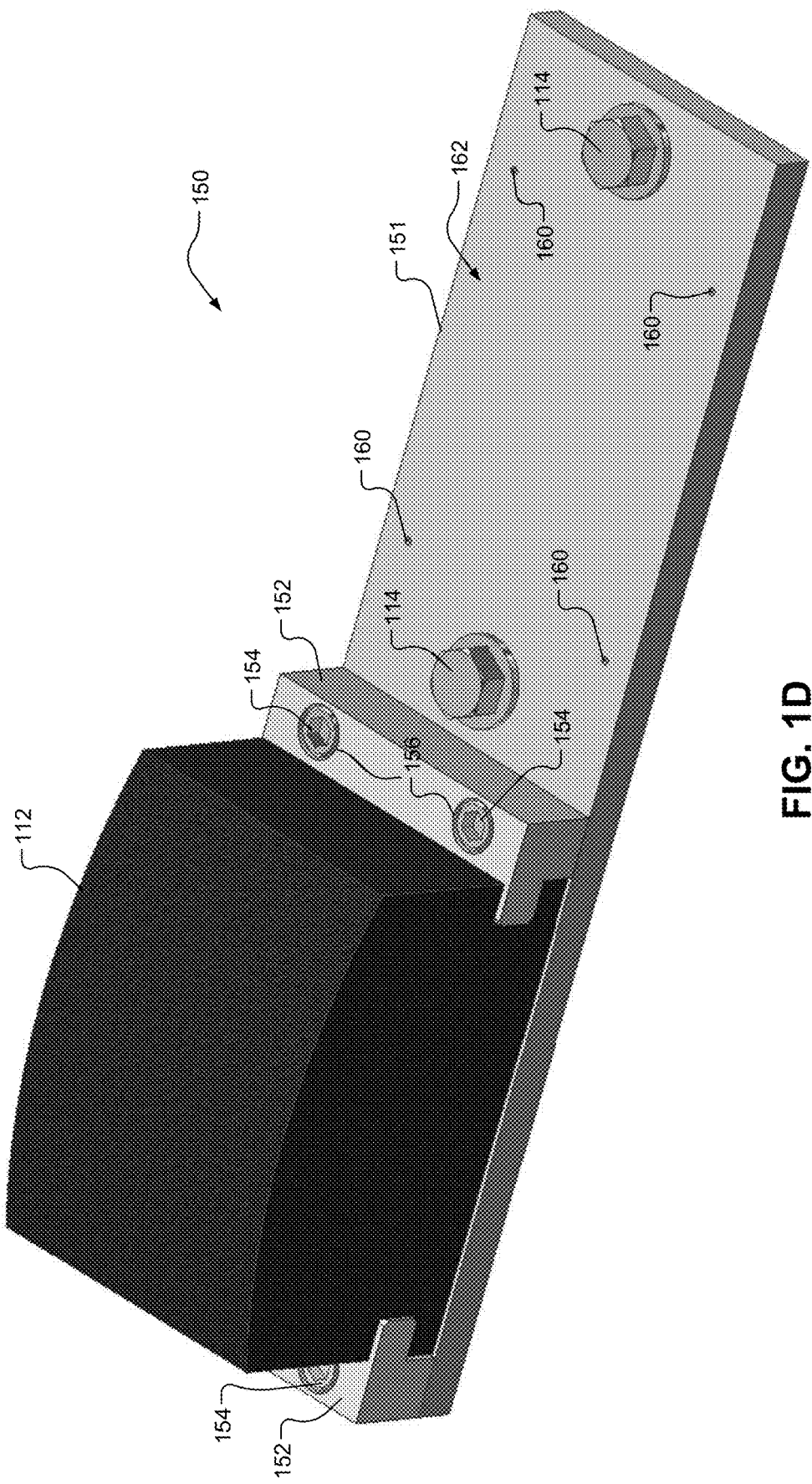
FIG. 1D is a perspective view of an example version of one of the secondary bumper assemblies of FIG. 1A.

FIG. 1D shows an example version of one of the secondary bumper assemblies of FIG. 1A. A secondary bumper assembly 150 is shown and includes the base plate 151, groove hold-down heel blocks 152, the secondary bumper 112, first fasteners 114 and second fasteners 154. The base plate 151 may be similar to the base plate 106, except the base plate 106 may not have the grooves 116. As a result, the groove hold-down heel blocks 152 may not be set in grooves in the base plate 151, but rather may be disposed on (or against) the base plate 151. The groove hold-down heel blocks 152 may have counterbored holes 156 for receiving the second fasteners 154. When the second fasteners 154 are fastened to the base plate 151, heads of the second fasteners 154 are disposed in the holes 154, such that ends of the heads are flush with surfaces of the groove hold-down heel blocks 152 furthest from the base plate 151. In one embodiment, the second fasteners 154 include internal hex screws designed to be turned with a hex key (sometimes referred to as an Allen wrench). The base plate 151 may include predrilled holes 160 for a nameplate (not shown), which may be attached to the base plate 151 in a designated name plate area 162 between two or more of the first fasteners 114.

The plates (e.g., base plates, end plates, retaining plates, etc.), the heel blocks, and the fasteners (e.g., bolts, screws, pins, etc.) disclosed herein may be formed of steel, aluminum, and/or other suitable materials. Although the heel blocks disclosed herein are shown as being fastened to or integrally formed as part of base plates, the heel blocks may be welded to the base plates. Also, although the base plates disclosed herein are shown as being fastened to primary bumpers, the base plates may be welded to the primary bumpers.

Figure 2C:
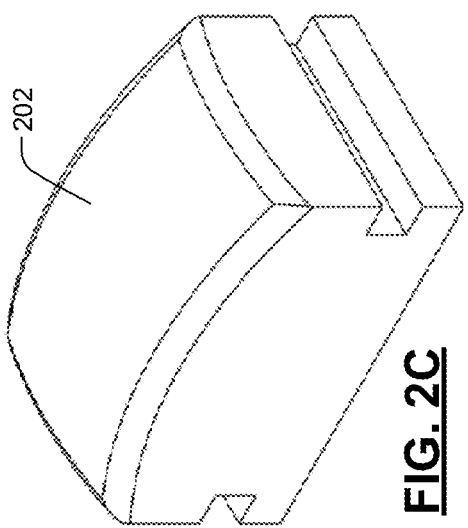
FIG. 2C is a perspective view of the secondary bumper of FIG. 2A.
Figure 3C:
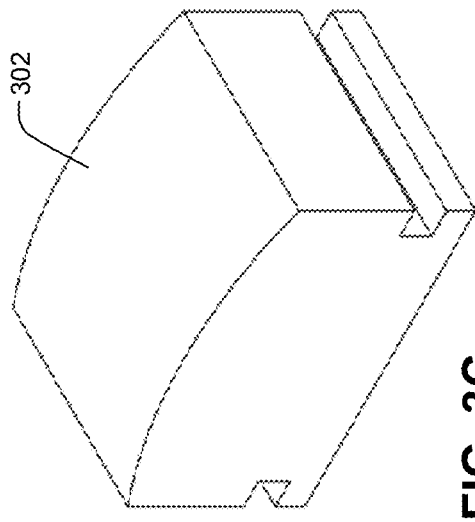
FIG. 3C is a perspective view of the secondary bumper of FIG. 3A.
Figure 2B:
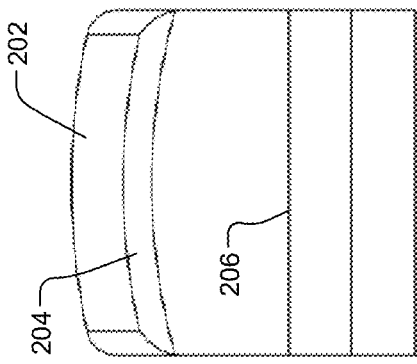
FIG. 2B is another side perspective view of the secondary bumper of FIG. 2A.
Figure 3B:
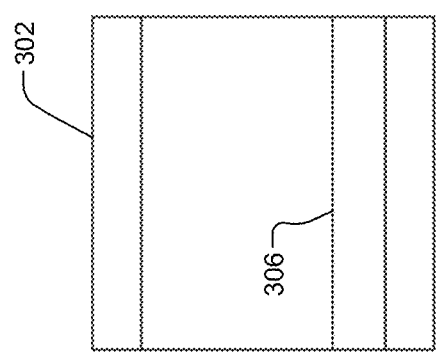
FIG. 3B is another side view of the secondary bumper of FIG. 3A.
Figure 2A:
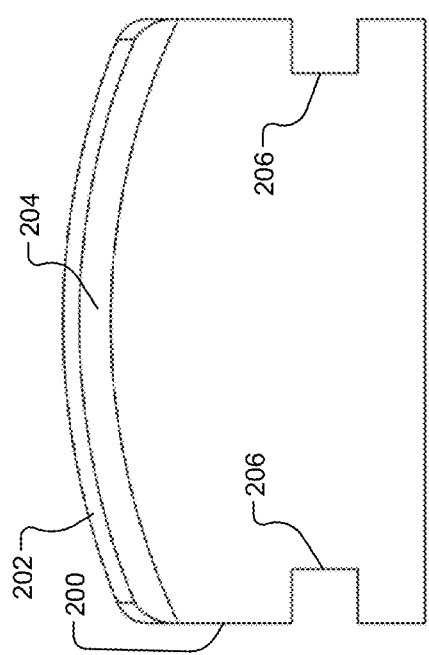
FIG. 2A is a side perspective view of a secondary bumper including an arched outer bumping surface with a chamfered or filet shaped edge in accordance with an embodiment of the present disclosure.
Figure 3A:
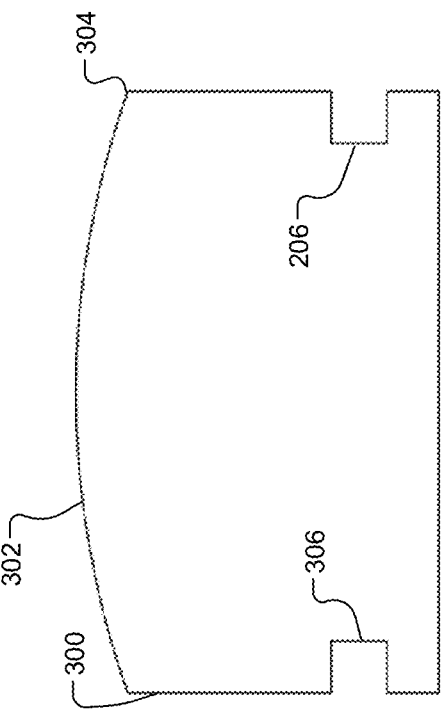
FIG. 3A is a side view of another secondary bumper having an arched outer bumping surface with a non-chamfered and non-filet shaped edge in accordance with an embodiment of the present disclosure.

FIGS. 2A-C show a secondary bumper 200 including an arched outer bumping surface 202 with a chamfered or filet shaped edge 204. The chamfered or filet shaped edge 204 may extend 360° around the arched outer bumping surface 204 as shown. The secondary bumper 200 may replace one or more of the secondary bumpers 112 of FIGS. 1A-1D. The secondary bumper 112 may be referred to as having a single contoured surface (i.e. surface 128). The secondary bumper 200 may be referred to as having two contoured surfaces (i.e. surface 202 and edge 204). By having a double contoured surface, the secondary bumper 200 has a longer lasting structure. This structure minimizes wear on the secondary bumper 200 associated with a corresponding vehicle being backed up at an angle relative to a loading dock. The doubled contoured structure also provides a more uniform bump when a vehicle descends into a loading bay. FIGS. 3A-C show another secondary bumper 300 having an arched outer bumping surface 302 with a non-chamfered and non-filet shaped edge 304. The secondary bumpers of FIGS. 2A-C and 3A-C include two clamping grooves 206, 306 on opposite sides of the secondary bumpers 200, 300.

Figure 4:
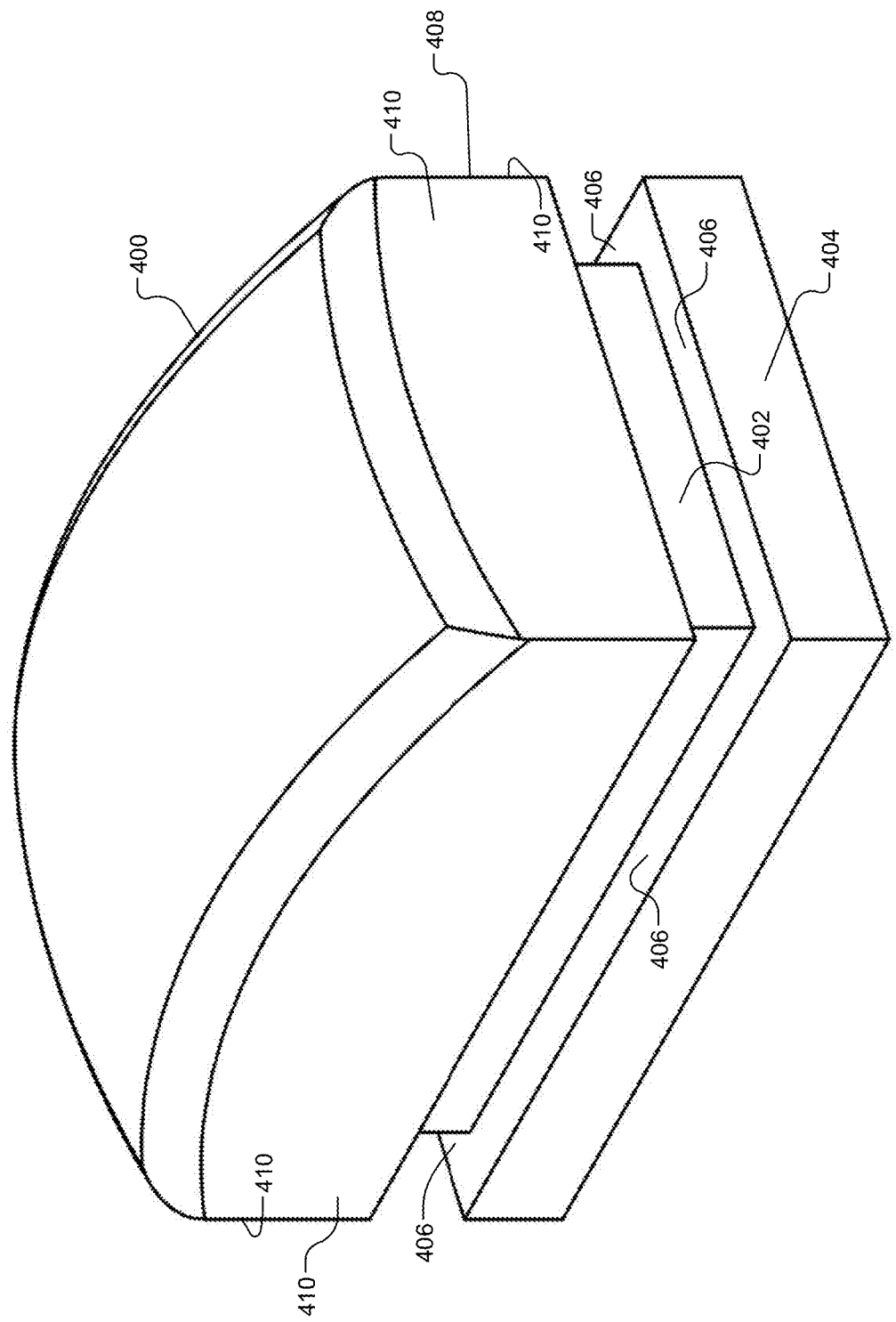
FIG. 4 is a perspective view of a secondary bumper including a clamping groove extending 360° around the secondary bumper.

FIG. 4 shows a secondary bumper 400 including a clamping groove 402 that extends 360° around the secondary bumper 400. The clamping groove 402 extends along four sides of the secondary bumper 400 and includes four grooves that extend along each of four sides of the secondary bumper 400. By having a clamping groove that extends along each of the four sides, the secondary bumper 400 may be clamped down using horizontally oriented or vertically oriented groove hold-down heel blocks. The secondary bumper 400 includes a base 404 having base segments 406 and a main body 408 having tapered ends 410. One of the base segments 406 and one of the tapered ends 410 is on each of the four sides of the secondary bumper 400.

FIGS. 5A-C show a secondary bumper 500 that is similar to the secondary bumper 300 of FIG. 3A, but includes a pass-through side interior pocket 502. The pass-through side interior pocket 502 extends through a main body 504 in a direction parallel to a base surface 506. The pass-through side interior pocket 502 may not be disposed between inner surfaces 508 of a clamping groove 510. The pass-through side interior pocket 502 may have a flat interior surface 512 that is parallel to the base surface 506 and an arched interior surface 514, which is parallel to an arched outer surface 516. The pass-through side interior pocket 502 may have curved corners 518.

The secondary bumper 500 may be referred to as a flex bumper with an extruded cut-out, which aids in dampening a bumper-to-loading dock bump. The sizes and shapes of the secondary bumper 500 and the cut-out (or pass-through side interior pocket 502) may vary and be based on the vehicle application, the weight of the vehicle, and/or the class of vehicle (e.g., the class of a truck).

Figure 6C:
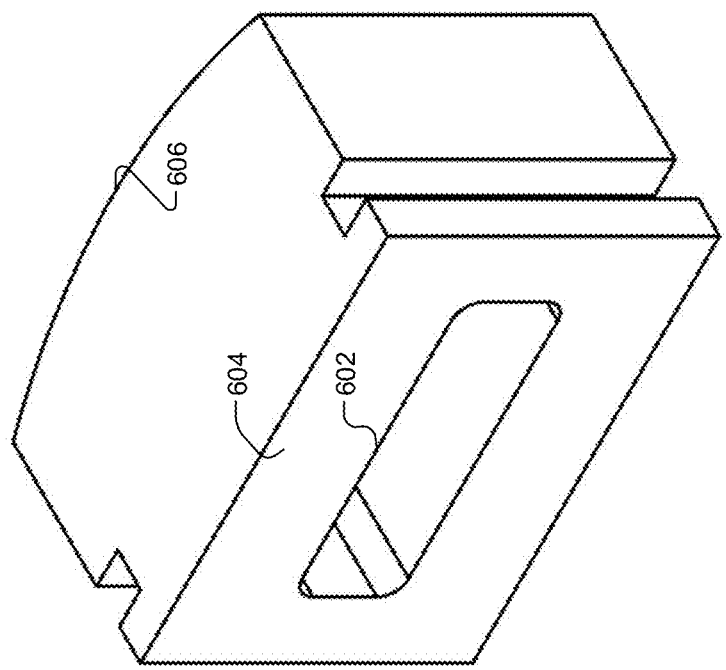
FIG. 6C is a perspective view of the secondary bumper of FIG. 6A.
Figure 6A:
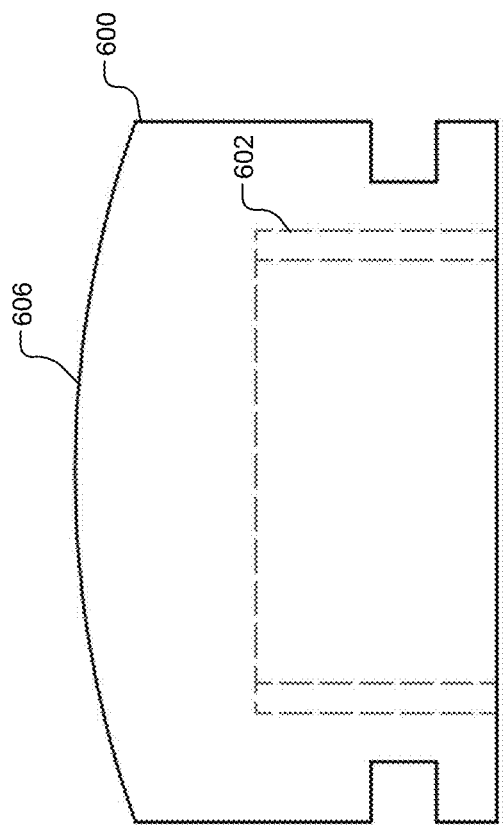
FIG. 6A is a side view of another secondary bumper including a fastener covering pocket in accordance with an embodiment of the present disclosure.
Figure 6B:
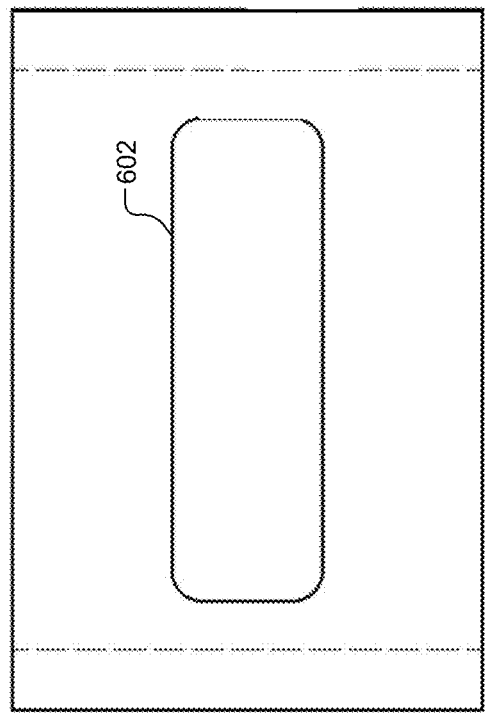
FIG. 6B is a side view of a mounting side of the secondary bumper of FIG. 6A illustrating an open end of the fastener covering pocket.

FIGS. 6A-C show a secondary bumper 600 that is similar to the secondary bumper 300 of FIG. 3A, except it includes a fastener covering pocket 602. The fastener covering pockets extends from an outer base surface 604 inwards and towards an arched outer surface 606. The fastener covering pocket 602 may be used to, for example, cover heads of fasteners used to fasten a corresponding base plate to a primary bumper. The fastener covering pocket 602 may be used to cover a portion of one or more fasteners as described and/or may be provided to change the dynamic response of the secondary bumper 600. The pass-through side interior pocket 502 of FIG. 5 and the fastener covering pocket 602 of FIG. 6 provide more of a spring-like cushion during a bump event.

Figure 7A:
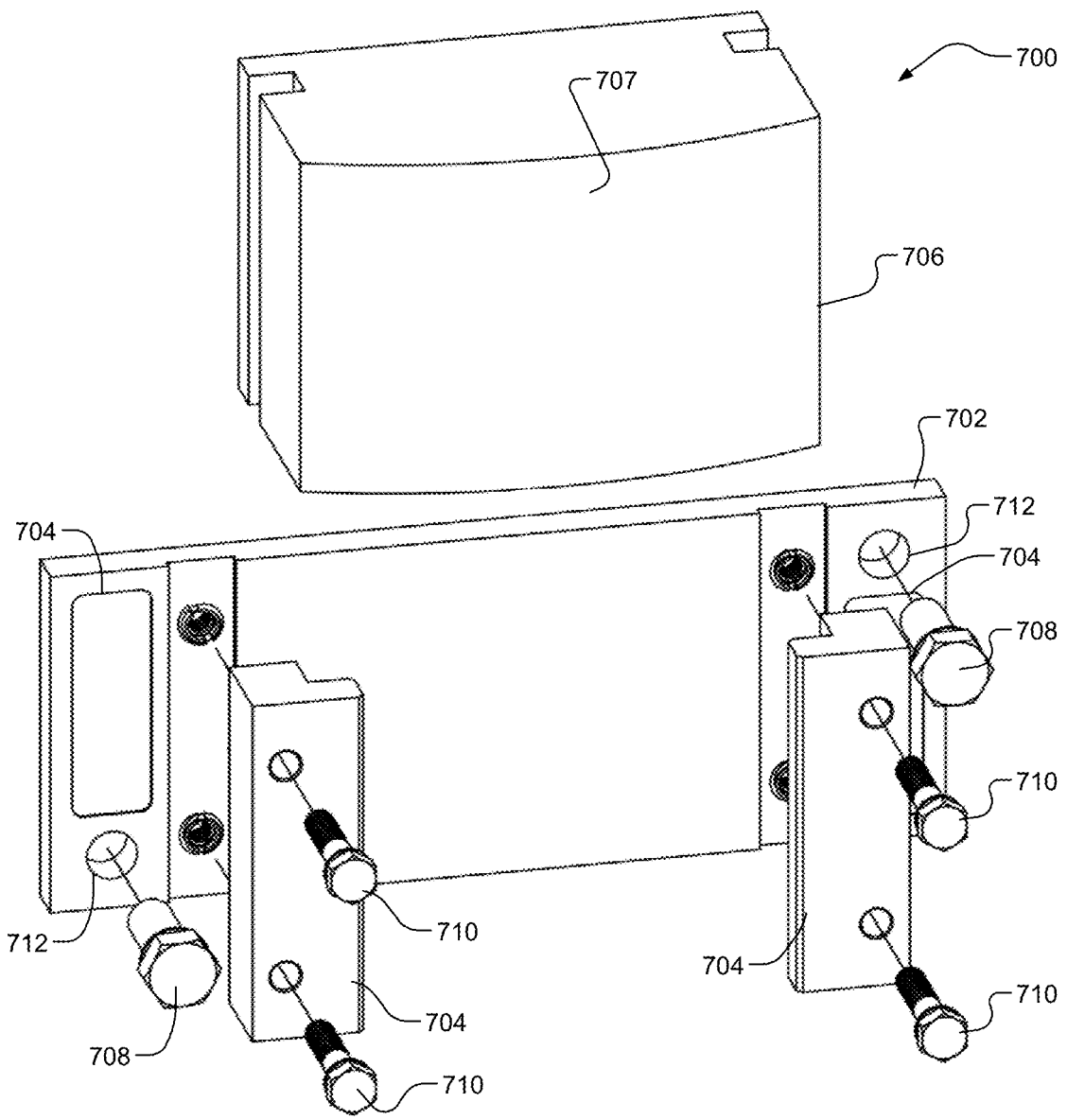
FIG. 7A is a perspective view of another secondary bumper assembly including groove hold-down heel blocks and a base plate with dual cross disposed fastener holes in accordance with an embodiment of the present disclosure.

FIG. 7A shows a secondary bumper assembly 700 that is similar to the secondary bumper assembly 102 of FIG. 1, but includes a different base plate 702. The secondary bumper assembly 700 includes the base plate 702, groove hold-down heel blocks 704, a secondary bumper 706, first fasteners 708 and second fasteners 710. Although the secondary bumper 706 is shown as having an arched front surface 707, the secondary bumper 706 may have a flat front surface.

The base plate 702 includes dual cross disposed fastener (or mounting) holes 712 for the first fasteners 708. The cross disposed fastener holes 712 are at opposite corners 714 of the base plate 702. The cross disposed fastener holes 712 are located outside the secondary bumper 706 for access to the fasteners 708 without removing the secondary bumper 706 from the base plate 702. The base plate 702 may be longer than a base plate where holes for fastening the base plate to a primary bumper are located underneath (or behind) the corresponding secondary bumper, such is the case for the example embodiment of FIG. 8A. The other corners 716 of the base plate 702 do not include holes for fasteners, but rather include recessed areas (referred to as nameplate pockets) and/or surfaces 704 for tags. In an embodiment, the tags identify the manufacturer of the secondary bumper assembly 700.

Figure 7B:
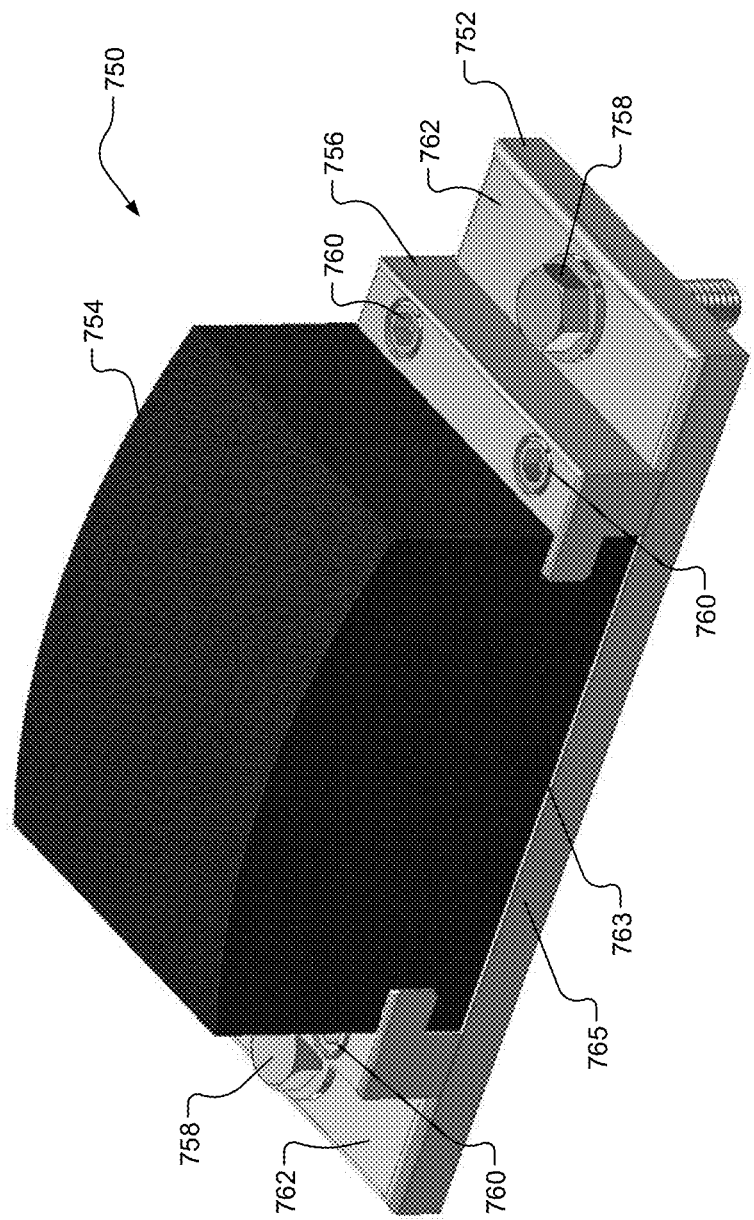
FIG. 7B is a perspective view of another secondary bumper assembly including groove hold-down heel blocks and a base plate with centered fastener holes in accordance with an embodiment of the present disclosure.

Although the holes 712 are shown at corners of the base plate 702, the holes may be at other locations. For example, the holes 712 may be centrally located and along the ends of the base plate 702 and the recessed areas 704 may not be incorporated in the base plate 702. FIG. 7B provides an example of where the holes for the first fasteners are centrally located and the recessed areas are not incorporated in a base plate.

FIG. 7B shows a secondary bumper assembly 750 that includes a base plate 752, a secondary bumper 754, groove hold-down heel blocks 756 first fasteners 758 and second fasteners 760. The groove hold-down heel blocks 756 are heeled against protruding ends 762 of the base plate 702 in a pocket 763, which is provided by the protruding ends 762 and a center section 765 of the base plate 702. This allows the groove hold-down heel blocks 756 to withstand a load exerted by the secondary bumper 754 when the secondary bumper 754 is compressed during a bump event with a loading dock. The protruding ends 762 provide a heel block pocket therebetween for the blocks 756 and a base of the secondary bumper 754.

Figure 8A:
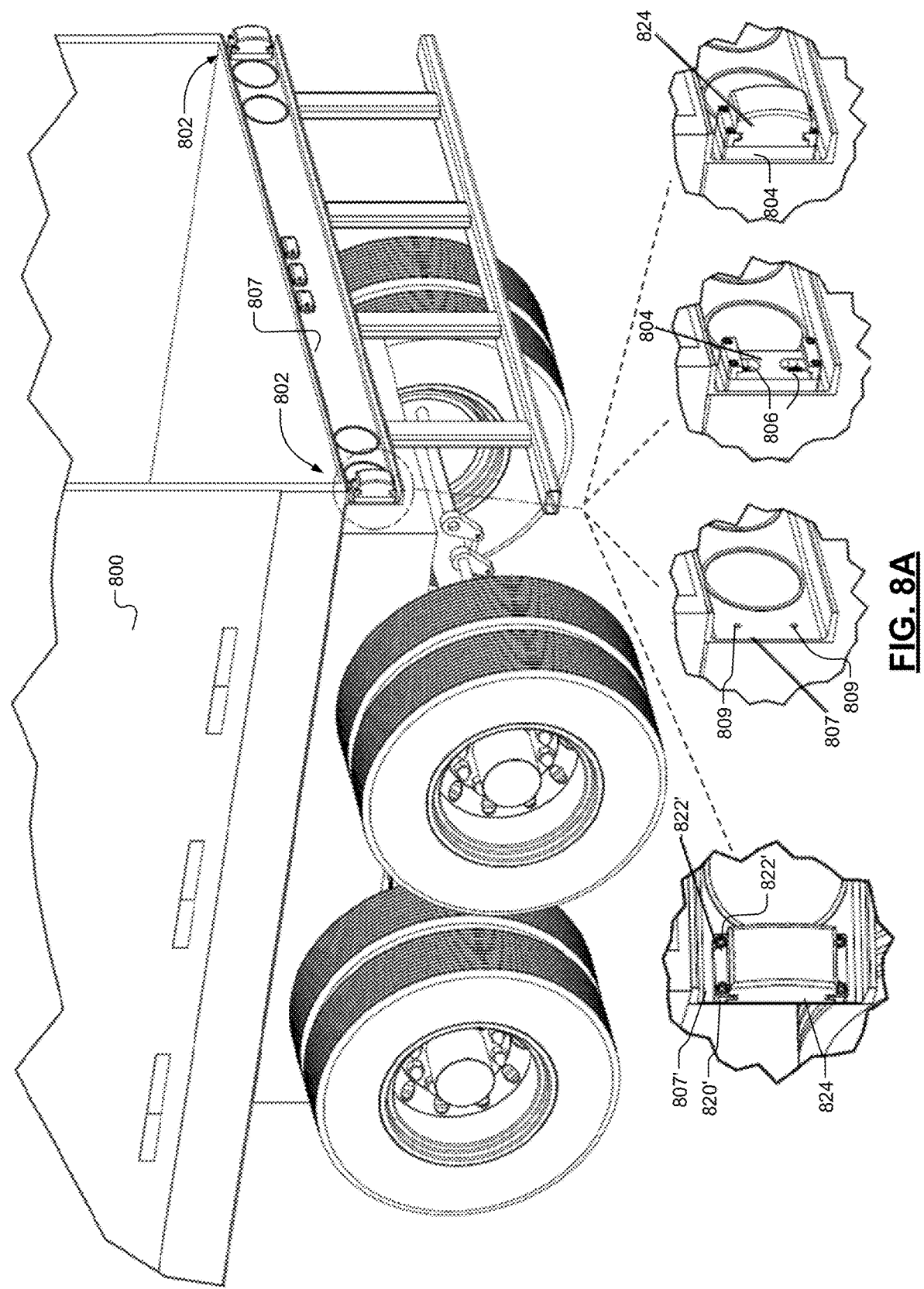
FIG. 8A includes perspective views of a rear portion of a vehicle including secondary bumper assemblies including base plates with dual mounting counterbored holes for vertically orienting the secondary bumper assemblies in accordance with an embodiment of the present disclosure.
Figure 8B:
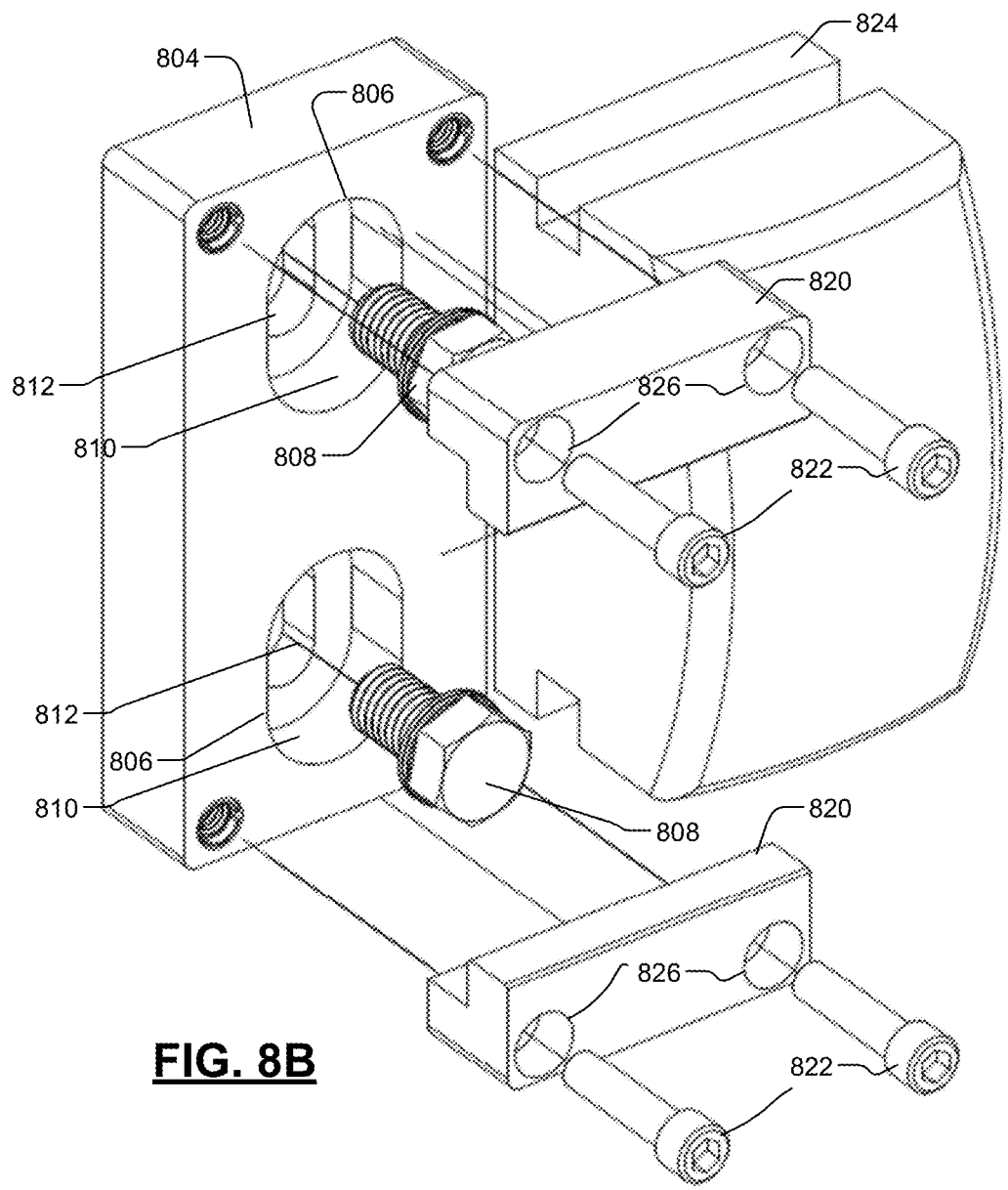
FIG. 8B is an exploded perspective view of the secondary bumper assembly of FIG. 8A including the base plate with mounting slots.

FIGS. 8A-B show a rear portion 800 of a vehicle including secondary bumper assemblies 802 including based plates 804 with dual mounting counterbored holes 806 for vertically orienting the secondary bumper assemblies 802. The base plates 804 are fastened to a primary bumper 807 via first fasteners 808. The first fasteners may screw into, for example, holes 809 in the primary bumper 807. The dual mounting counterbored holes 806 may be slots as shown having recessed (or first) portions 810 that are larger than second portions 812. The slots allow the secondary bumper assemblies 802 to be adjusted in vertical or horizontal directions depending on whether the secondary bumper assemblies 802 are mounted vertically or horizontally.

The secondary bumper assemblies 802 further include groove hold-down heel blocks 820, second fasteners 822 and secondary bumpers 824. The groove hold-down heel blocks 820 include counterbored holes 826 for the second fasteners 822. The secondary bumpers 824 may be similar to, for example, the secondary bumpers shown in FIGS. 1A, 2A, 3A, 4, 5A and 6A. The counterbored holes 826 may be sized to accommodate multiple different hole patterns on primary bumpers of different vehicles. Base segments of the secondary bumpers 824 are slid between the base plates 804 and the groove hold-down heel blocks 820 and then the second fasteners 822 are tightened to hold the secondary bumpers 824 in place.

In one embodiment, the secondary bumpers 824 are held to the primary bumper 807 without use of a base plate. This is illustrated by use of the groove hold-down heel blocks 820' having fasteners 822' that are screwed into corresponding threaded holes in the primary bumper 807'. The secondary bumpers 824 may not be configured to directly mount to the primary bumper 807' without use of a pair of heel blocks, such as the heel blocks 820'.

When mounting the secondary bumper assembly 802, the base plate 804 is mounted to a primary bumper of a vehicle using the first fasteners 808. The groove hold-down heel blocks 820 are then held onto the base plate 804 via the fasteners 822 while leaving the fasteners 822 in a loose state. The secondary bumper 824 is then slid onto the base plate until sides of the secondary bumper 824 are flush with sides of the base plate and sides of the groove hold-down heel blocks 820. The fasteners 822 are then tightened to a predetermined torque setting, which squeezes the base segments of the secondary bumper 824 and prevents the secondary bumper 824 from moving relative to the base plate 804.

FIGS. 9A-B show a secondary bumper assembly 900 including a base plate 902, integrated bumper groove flanges 904, trapping heel blocks 906, first fasteners 908, second fasteners 910 and a secondary bumper 912. The integrate bumper groove flanges 904 may be formed with a remainder of the base plate 902 as a unitary structure. Base segments of the secondary bumper 912 may be slid into grooves 914 provides by the flanges 904 and opposing inner surfaces 916 of the base plate 902. The trapping heel blocks 906 are used to prevent the secondary bumper 912 from sliding off the base plate 902.

Each of the trapping heel blocks 906 may be 'L'-shaped and have first portions 918 that are slid into slots 920 in the base plate. The first portions 918 include threaded holes 922. Fasteners 924 are extended through 'U'-shaped notches 924 in the base plate 902 and screwed into the holes 922 to hold the trapped heel blocks 906 to the base plate 902. In one embodiment, the notches 924 are replaced with holes in the base plate extending from sides of the base plate into the slots 920. The trapping heel blocks 906 may be installed as a fixed trapping block, whereas the other one of the trapping heel blocks 906 may be removable. The trapping heel blocks are used to retain the secondary bumper 912.

FIG. 9C shows an alternative base plate 950 that may be used instead of the base plate 902 of FIG. 9A. In an embodiment, the base plate 950 is an extruded part formed of aluminum. The base plate 950 includes counterbored centrally located mounting holes 953 and integrated bumper groove flanges 954 and has associated trapping heel blocks 956, first fasteners 958. In an embodiment, the counterbored centrally located mounting holes 953 are slots as shown. The counterbored holes 953 are protected from weather when covered by the secondary bumper 912 of FIG. 9A. Exposed ends of heads of the first fasteners 908 of FIG. 9A, when the first fasteners 908 are inserted in the holes 953 of FIG. 9C and fastened to a primary bumper, are flush with an inner surface 962 of the base plate 950. Heads of the first fasteners 958, when fully inserted in the holes 953, may not protrude out from the inner surface 962 and may be "below flush" with the inner surface 962.

The secondary bumper 912 slides easily over the first fasteners 958 and the counterbored holes 953. In one embodiment, a distance D1 between the counterbored holes 953 is the same or similar to a distance between traditional horizontal pass-through holes used to mount traditional secondary bumpers to a primary bumper. This allows the base plate 902 to be mounted to a traditional primary bumper without modification to the primary bumper.

One of the trapping heel block may be shaped to provide an interference fit with one of the slots 964 in the base plate 950. This trapping heel block may be driven into the slot for a more permanent/fixed relationship between the trapping heel block and the base plate 950. The other trapping heel block may be shaped to provide a slip fit between the trapping block and the base plate 950. The other trapping heel block may have threaded holes to receive the fasteners 910. The flanges 954 and the fixed trapping heel block prevent movement of the secondary bumper 912 relative to the base plate in three directions. When the secondary bumper 912 is slid onto the base plate 950 and the slip fitting trapping heel block is inserted in the corresponding slot of the base plate 950, the secondary bumper 912 is blocked from sliding in a first direction (e.g., y direction). The flanges 954 prevent movement in the x and z directions. As a result, the secondary bumper 912 is blocked from moving in x, y and z directions relative to the base plate 950.

FIG. 9D show a secondary bumper assembly 970 that is similar to the secondary bumper assemblies 750 of FIG. 7B and 900 of FIG. 9A. The secondary bumper assembly 970 includes a base plate 972, a heel block pocket 974, trapping heel blocks 976, first fasteners 978, second fasteners 980 and a secondary bumper 982. The second fasteners 980 may be inserted through a bottom surface 984 of the base plate 972 and screwed into groove hold-down heel blocks 986. The base plate 972 may include counterbored holes 988 that allow heads of the second fasteners 980 to be inserted into the base plate 972 such that the exposed ends of the heads are flush with the bottom surface 978 when inserted into the holes 988. The groove hold-down heel blocks 986 are bolted onto the base plate 972 and back up against corresponding machined heels 989 to take side loading, which alleviates some of the load on the second fasteners 980.

Figure 9E:
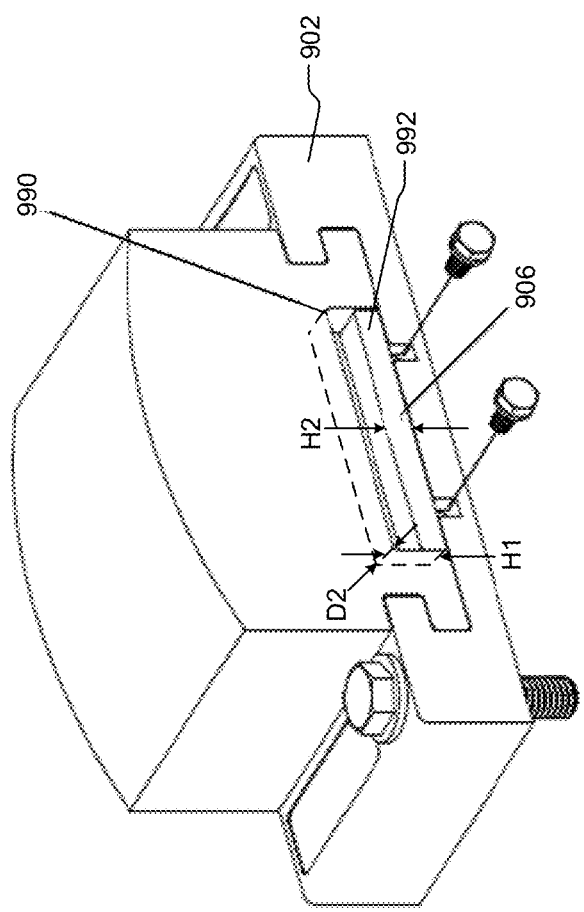
FIG. 9E is a side perspective view of the secondary bumper assembly of FIG. 9A illustrating fastening of the trapping heel blocks.

Referring to FIGS. 9A-B and 9E, the secondary bumper 912 of the secondary bumper assembly 900 includes side pockets 990 for the trapping heel blocks 906. A depth D2 of the side pockets 990 may be equal to or greater than a width W of the trapping heel blocks 906. A height H1 of the side pockets 990 may be greater than or equal to a height H2 of a portion 992 of the trapping heel blocks 906 disposed on the base plate 902 when the trapping heel blocks 906 are in the slots 920. This allows the trapping heel blocks 906 to be removed while the secondary bumper 912 is on the base plate 902 and over the trapping heel blocks 906.

FIGS. 10A-D show a rear portion 1000 of a vehicle including secondary bumper assemblies 1002 that are mounted on a primary bumper 1003 and rails 1005 extending down from the primary bumper 1003. Each of the secondary bumper assemblies 1002 includes a base plate 1004, a secondary bumper 1006, and end caps 1008. The secondary bumpers 1006 are long and narrow bumpers as compared to other secondary bumpers disclosed herein. Each of the secondary bumpers 1006 includes a main body 1010 and a pair of channel interface members 1012. The channel interface members 1012 form a first channel 1014 in the corresponding secondary bumper for receiving a center member 1016 of a corresponding one of the base plates 1004. Each of the channel interface members 1012 in effect hooks around a portion of the center member 1016 after being slid onto the center member 1016 to interlock with the center member 1016. Sidewalls 1026 of the base plate 1004 prevent the channel interface members 1012 from flexing latterly outward away from the center member 1016. The channel interface members 1012 are shaped to slide in respective member channels 1018 of the base plates 1004. The member channels 1018 may include grooves 1020 for holding ends of the channel interface members 1012 and preventing movement of the secondary bumpers 1006 in a first direction relative to the base plates 1004. The first direction is perpendicular to a second direction that the secondary bumpers 1006 are slid onto the base plates 1004.

The end caps 1008 may be in the form of plates that are fastened to ends of the base plates 1004 and are used to prevent movement of the secondary bumpers 1006 relative to the base plates 1004 in the second direction (or direction in which the secondary bumpers 1006 are slid onto and/or off of the base plates 1004). The secondary bumpers 1006 are referred to as a trapped bumpers due to the use of the end caps 1008. The end caps 1008 may be fastened to the base plates 1004 via fasteners 1022 (e.g., screws) as shown. The end caps 1008 aid in preventing water and debris from entering the channels 1018.

In addition to or as an alternative to using the end caps 1008, one or more of the channel interface members 1012 may include holes 1024 and side walls 1026 of the base plate 1004 may include corresponding holes 1028 for receiving fasteners 1029. In one embodiment, the fasteners 1029 include bolts and nuts or clevis and cotter pins instead of screws. An example of this is shown in FIG. 10C. The secondary bumper 1006' of FIG. 10C is referred to as a clamped bumper due to the use of the fasteners 1029. Channel interface members 1012' of the secondary bumper 1006' include the holes 1028. The side walls 1026 extend parallel to the center member 1016' and form the channels 1018' with the center member 1016'. The fasteners 1029 may be extended through the holes 1028, the holes 1024 and screwed into holes 1030 in the center member 1016'.

The center members 1016 of the base plates 1004 may include mounting holes and/or slots (two holes 1040 and two slots 1042 are shown) through which corresponding fasteners 1044 may be inserted. The fasteners 1044 may be used to mount the base plates 1004 to primary bumpers. Exposed ends of the heads of the fasteners 1044 may "below flush" mounted, such that the secondary bumper 1006 does not come in contact with the heads when slid onto the base plate 1004. As one example, the base plate may be formed of extruded aluminum.

Figure 10A:
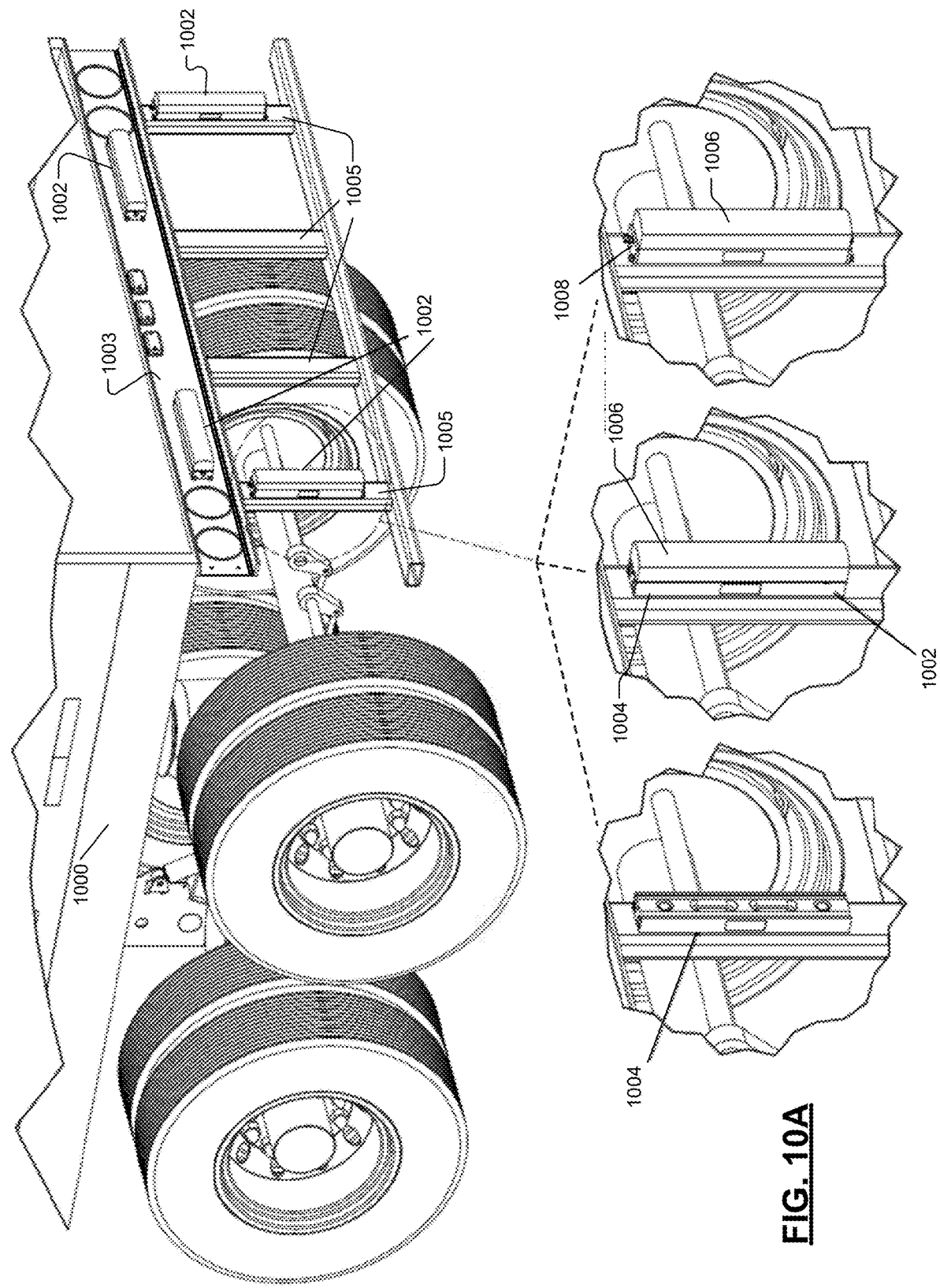
FIG. 10A includes perspective views of a rear portion of a vehicle including secondary bumper assemblies incorporated elongated secondary bumpers in accordance with another embodiment of the present disclosure.
Figure 10E:
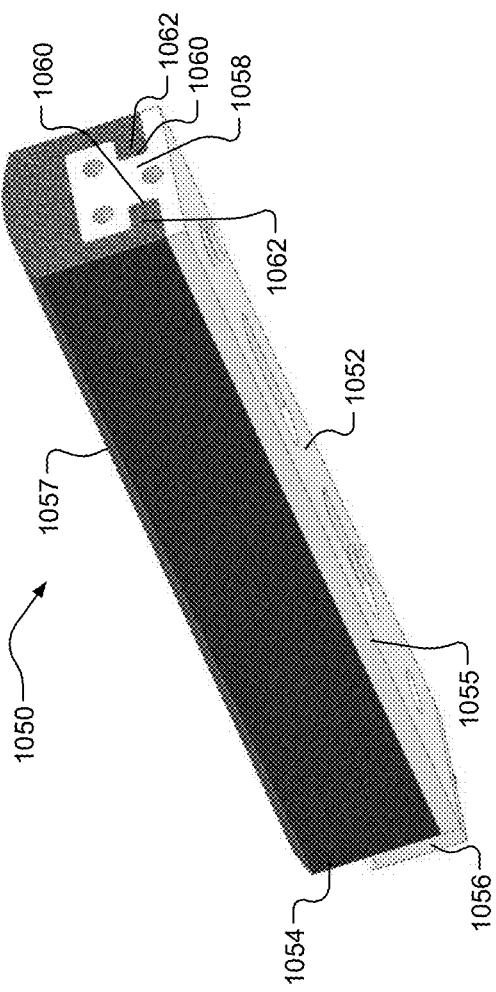
FIG. 10E is a perspective view of a portion of another secondary bumper assembly including a straight Gib style secondary bumper in accordance with an embodiment of the present disclosure.
Figure 10D:
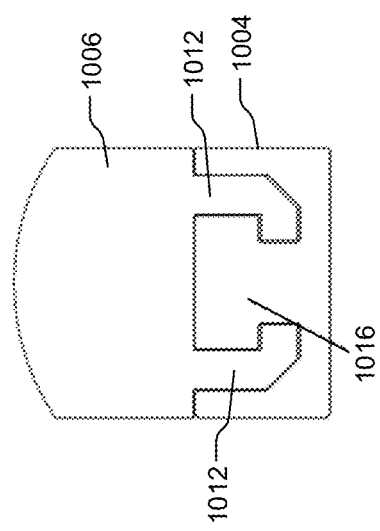
FIG. 10D is an end view of one of the secondary bumper assemblies of FIG. 10A with the corresponding end cap.

FIG. 10E shows a portion 1050 of another secondary bumper assembly similar to the secondary bumper assemblies 1002 of FIG. 10A. The secondary bumper assembly includes a base plate 1052, a secondary bumper 1054, a bottom retainer plate 1055 and end plates (one end plate 1056 is shown). The secondary bumper 1054 may have an arched bumper surface 1057 as shown or a flat bumper surface with a maximum thickness that is maintained longitudinally between the end plates 1056 of the secondary bumper 1054. The base plate 1052 includes a T'-shaped center member 1058. The center member 1058 may be integrally formed with the bottom retainer plate 1055 and includes grooves 1060 for receiving ends of outer interface members 1062. The center member 1058 and the secondary bumper 1054 in the example of FIG. 10E are directed to a straight Gib method of interaction between the center member 1058 and the secondary bumper 1054.

Figure 10F:
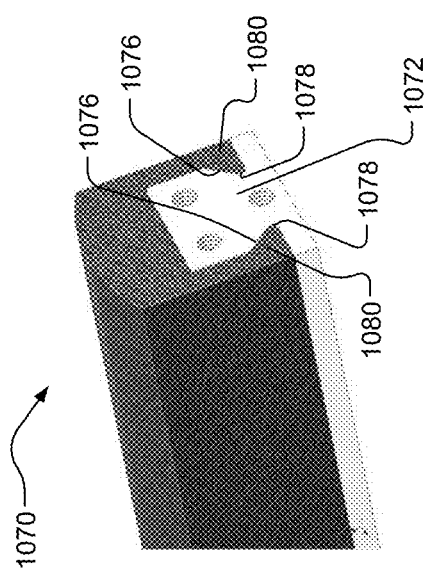
FIG. 10F is a perspective view of a portion of another secondary bumper assembly including a dovetail Gib style secondary bumper in accordance with an embodiment of the present disclosure.

FIG. 10F shows a portion 1070 of another secondary bumper assembly illustrating a dovetail Gib interaction between a center member 1072 and a secondary bumper 1074. In the dovetail Gib interaction method, grooves 1076 of the center member 1072 have vertices 1078, as opposed to flat innermost surfaces as do the grooves 1060 of the center member 1058 of the secondary bumper assembly of FIG. 10E. The outer interface members 1080 of the secondary bumper 1074 are shaped to fill the grooves 1076.

FIGS. 10G-H show a secondary bumper assembly 1090 including a secondary bumper 1091, a base plate having a center member 1092, a bottom retaining plate 1093, clevis pins 1094, and cotter pins 1095. The secondary bumper 1091 and the center member 1092 include lateral extending holes through which the cotter pins 1095 are disposed to prevent the secondary bumper 1091 from sliding relative to the center member 1092. The cotter pins 1095 are inserted in ends of the clevis pins 1094. In one embodiment, the secondary bumper assembly 1090 does not include the holes, clevis pins 1094 and the cotter pins 1095. This arrangement allows for easy replacement of the secondary bumper without need for tools.

Figure 11A:
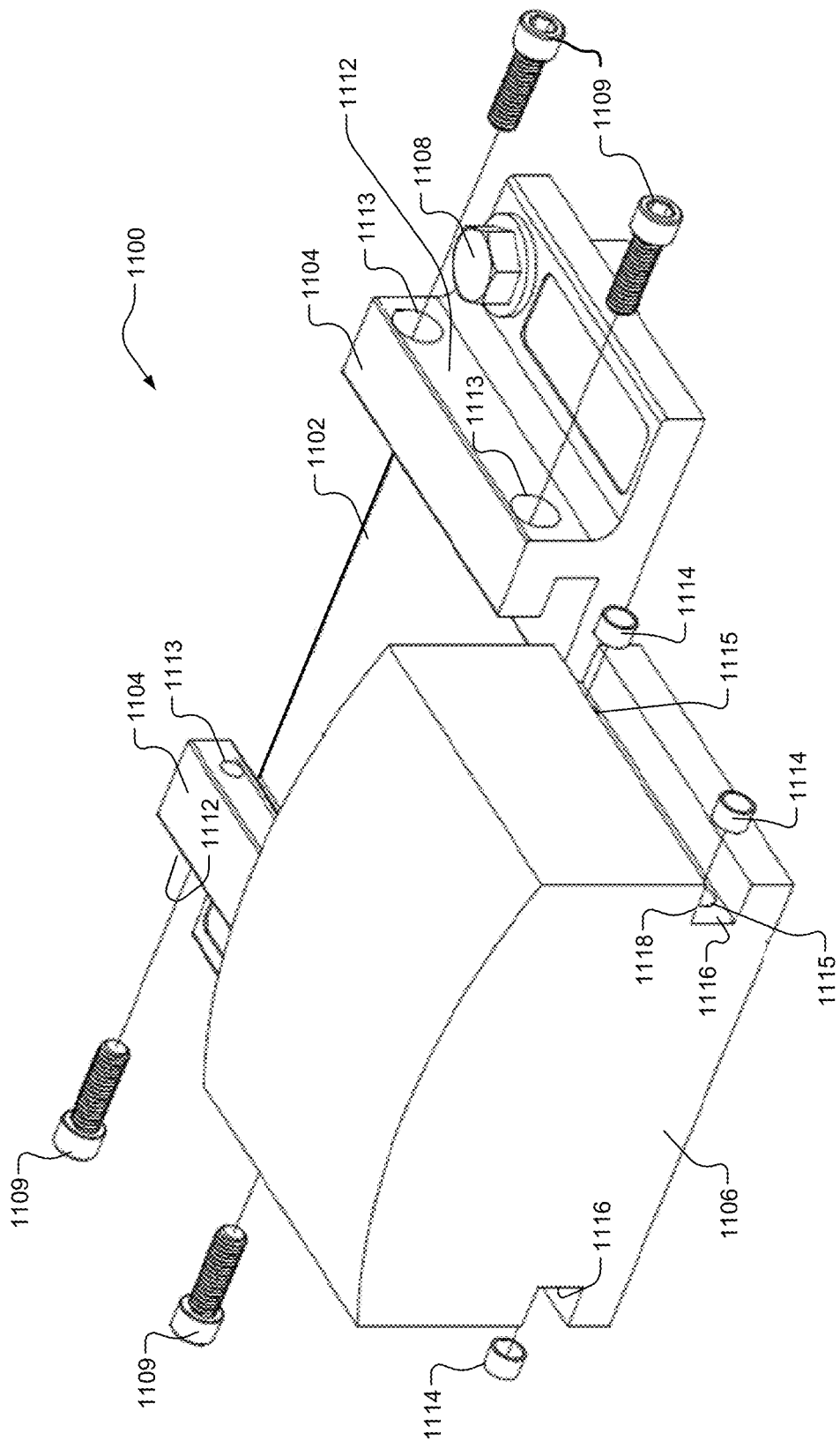
FIG. 11A is a perspective view of a secondary bumper assembly including bumper retaining fasteners and bushings in accordance with an embodiment of the present disclosure.
Figure 11B:
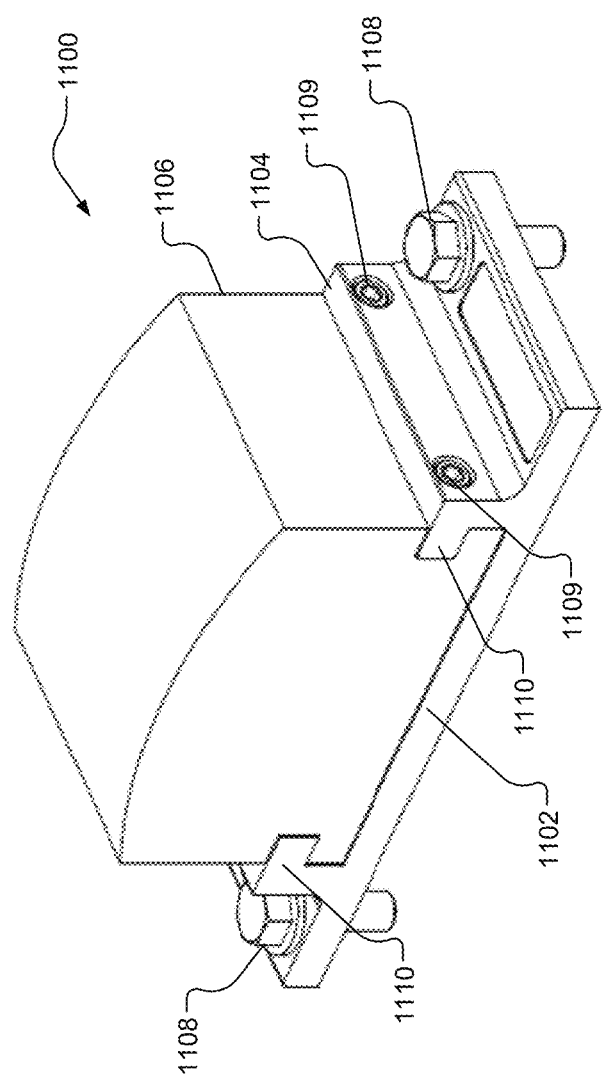
FIG. 11B is another perspective view of the secondary bumper assembly of FIG. 11A.
Figure 12A:
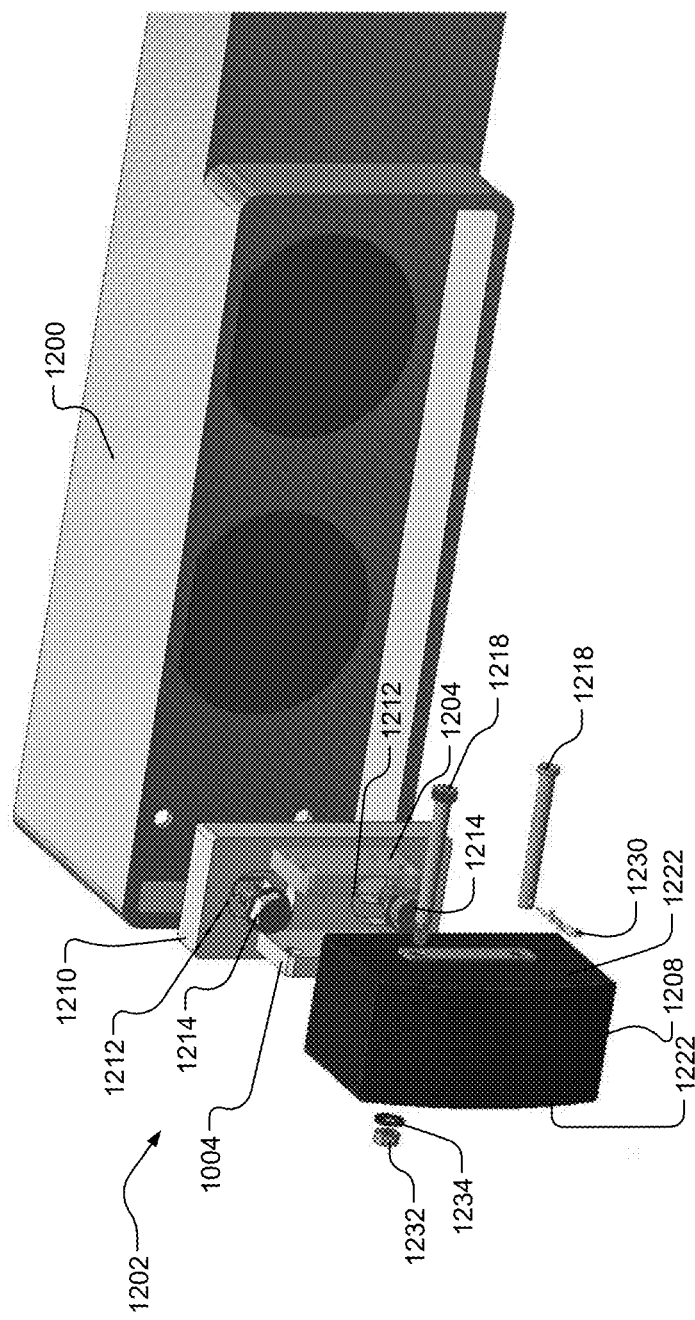
FIG. 12A is an exploded perspective view of a portion of a primary bumper and a secondary bumper assembly including a pair of protruding mounting plates received in a pair of mounting pockets of a secondary bumper in accordance with another embodiment of the present disclosure.
Figure 12B:
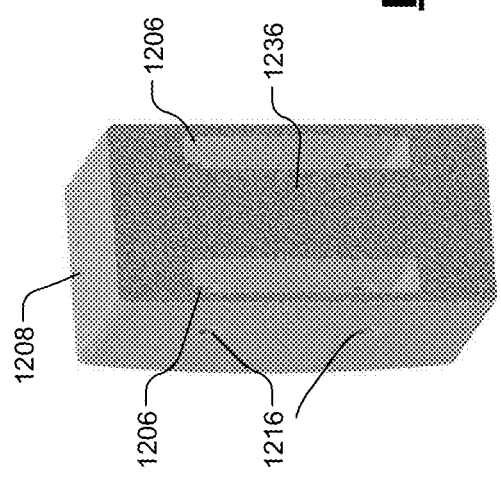
FIG. 12B is a perspective view of the secondary bumper of FIG. 12A illustrating the pair of mounting pockets.
Figure 12C:
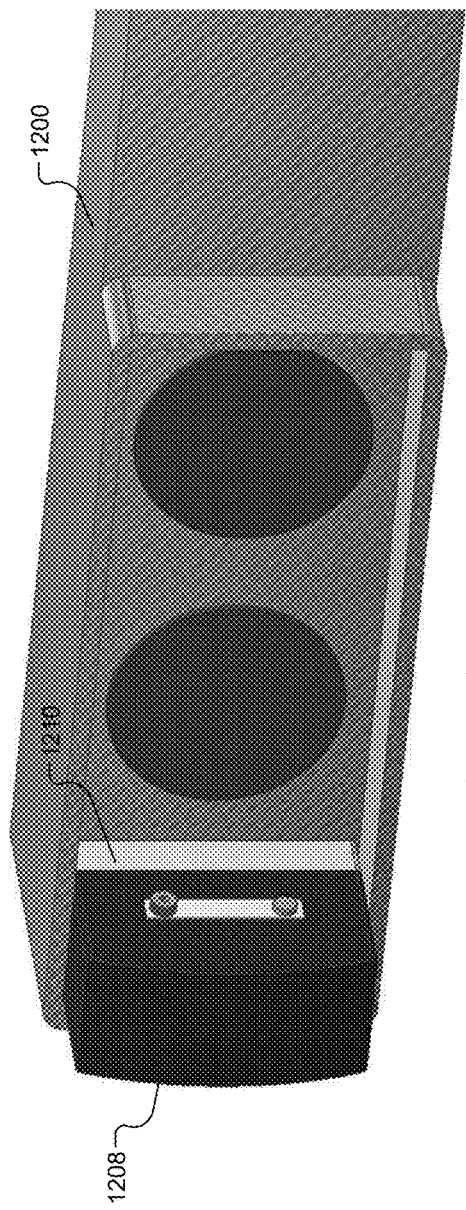
FIG. 12C is a first side perspective view of the primary bumper and secondary bumper assembly of FIG. 12A.
Figure 12D:
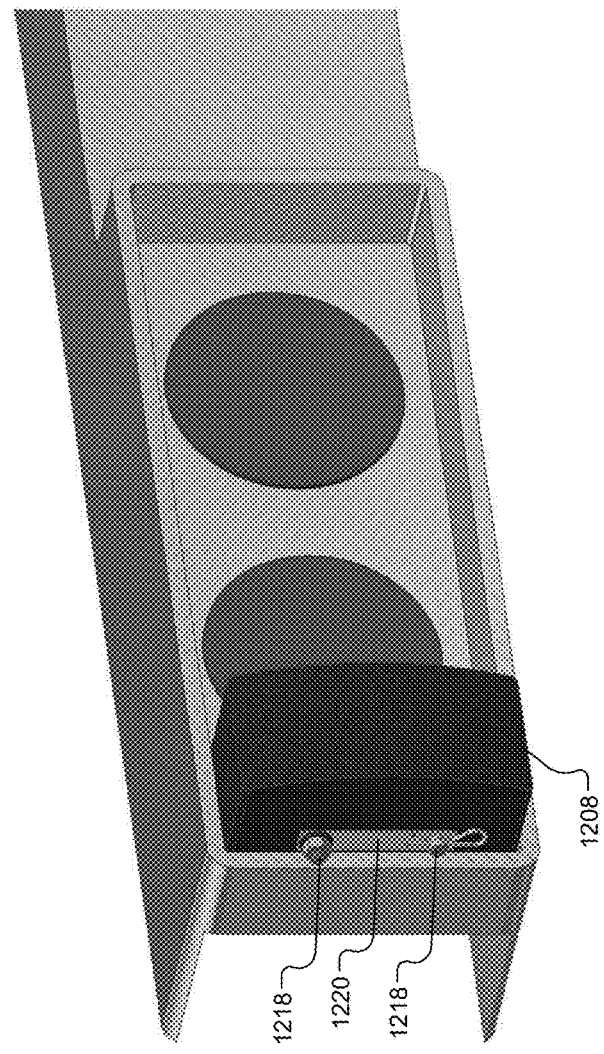
FIG. 12D is a second side perspective view of the primary bumper and secondary bumper assembly of FIG. 12A.

FIGS. 11A-B show a secondary bumper assembly 1100 that includes a base plate 1102, groove hold-down heel blocks 1104, a secondary bumper 1106, first fasteners 1108 and second fasteners 1109. The secondary bumper assembly 1100 is similar to the secondary bumper assembly 750 of FIG. 7B, except the groove hold-down heel blocks 1104 are integrally formed as part of the base plate 1102 and the secondary bumper 1106 is held in place via the second fasteners 1109, which extend through clamping flanges 1110 of the groove hold-down heel blocks 1104. In one embodiment, the base plate 1102 is an aluminum extruded base plate. The second fasteners 1109 extend through sides 1112 of the groove hold-down heel blocks 1104, through holes 1113 in the flanges 1110 and into bushings 1114 pressed into holes 1115 in innermost sides 1116 of grooves 1118 of the secondary bumper 1106. The second fasteners 1109 may be screwed into the bushings 1114. The interior of the bushings 1114 may be threaded. In one embodiment, the bushings 1114 are not threaded.

During assembly, the bushings 1114 are pressed into the holes 1115. The secondary bumper 1106 is slid onto the base plate 1102. The second fasteners 1109 are inserted into the holes 1113, which may be threaded, and engaged in the bushings 1114. In one embodiment, the holes 1113 are threaded and the bushings 1114 are not threaded. When the second fasteners 1109 are inserted into the bushings 1114, the secondary bumper 1106 is retained to the base plate 1102 and does not slide relative to the base plate 1102. The secondary bumper 1106 is not clamped to the base plate 1102, but rather is retained by the heel blocks 1104, the second fasteners 1109 and the bushings 1114.

FIGS. 12A-D show a portion 1200 of a primary bumper and a secondary bumper assembly 1202 including a pair of protruding mounting plates 1204 received in a pair of mounting pockets 1206 of a secondary bumper 1208. The secondary bumper assembly 1202 includes a base plate 1210 having counterbored holes (or slots as shown) 1212 for first fasteners 1214. The base plate 1210 may be fastened to the primary bumper 1200 via the first fasteners 1214. The mounting plates 1204 may be bolted onto the base plate 1210 or formed integrally as part of the base plate 1210. The mounting plates 1204 extend into the mounting pockets 1206, such that the secondary bumper 1208 is in contact with the base plate 1210.

The secondary bumper 1208 has side holes 1216 for receiving clevis pins (or screws) 1218. Side plates 1220 may be included and be disposed between heads of the clevis pins (or screws) 1218 and sides 1222 of the secondary bumper 1208. Cotter pins or nuts and washers (a single cotter pin 1230, a single nut 1232 and a single washer 1234 are shown) may be attached to the clevis pins (or screws) 1218. The clevis pins (or screws) 1218 are inserted through the side plates 1220, into the holes 1216 in sides 1222, through the mounting plates 1204, and through a center member 1236 of the secondary bumper 1208. The side plates 1220 are used as washers and may be used to increase rigidity of the sides of the secondary bumper 1208.

Figure 13:
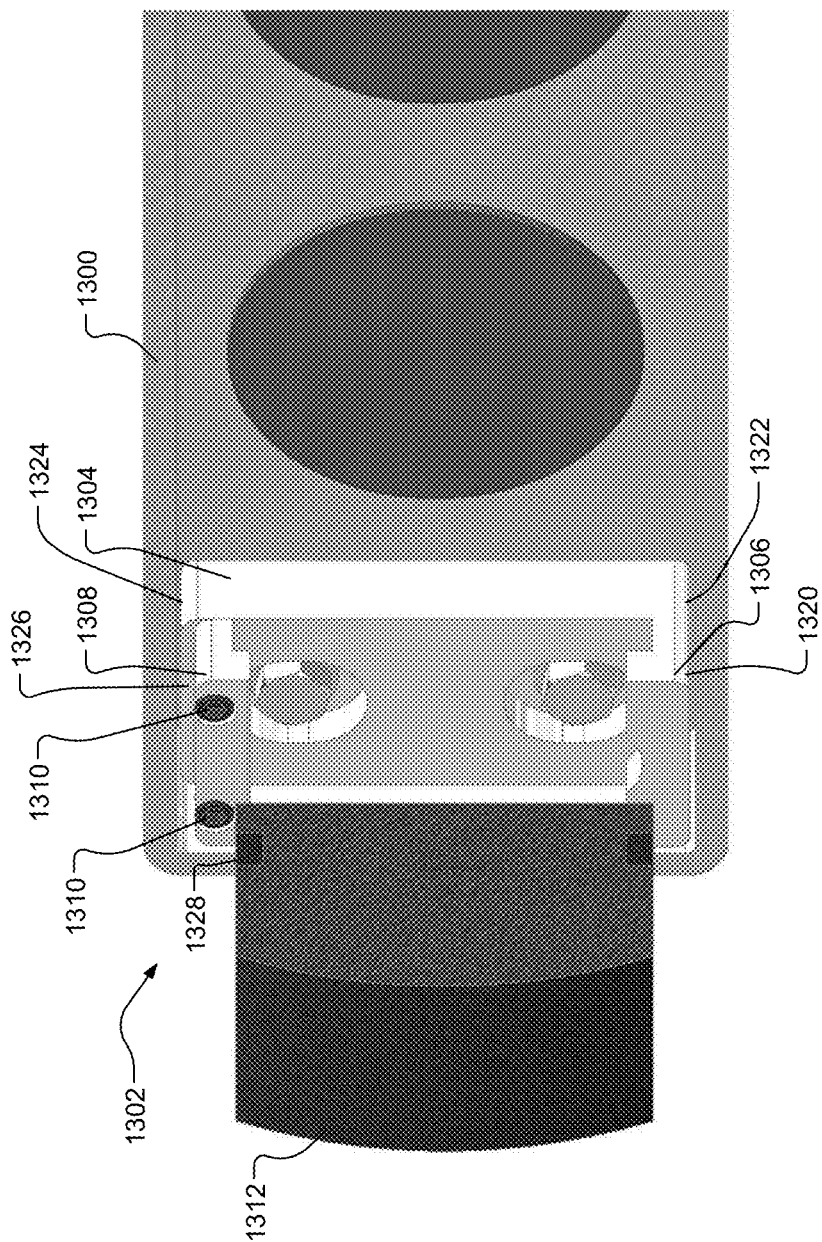
FIG. 13 is a perspective view of a portion of a primary bumper and a secondary bumper assembly including a single removable groove hold-down heel block in accordance with another embodiment of the present disclosure.
Figure 14B:
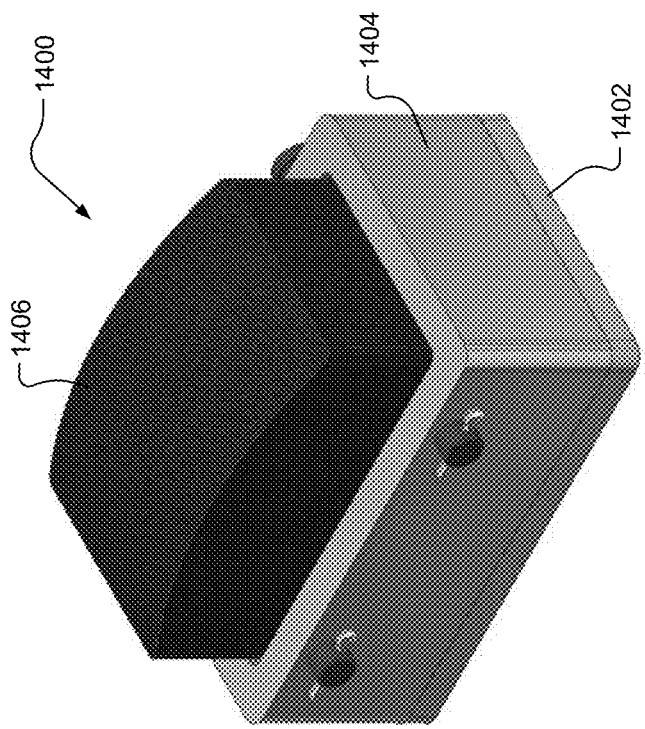
FIG. 14B is another top perspective view of the secondary bumper assembly of FIG. 14A.
Figure 14A:
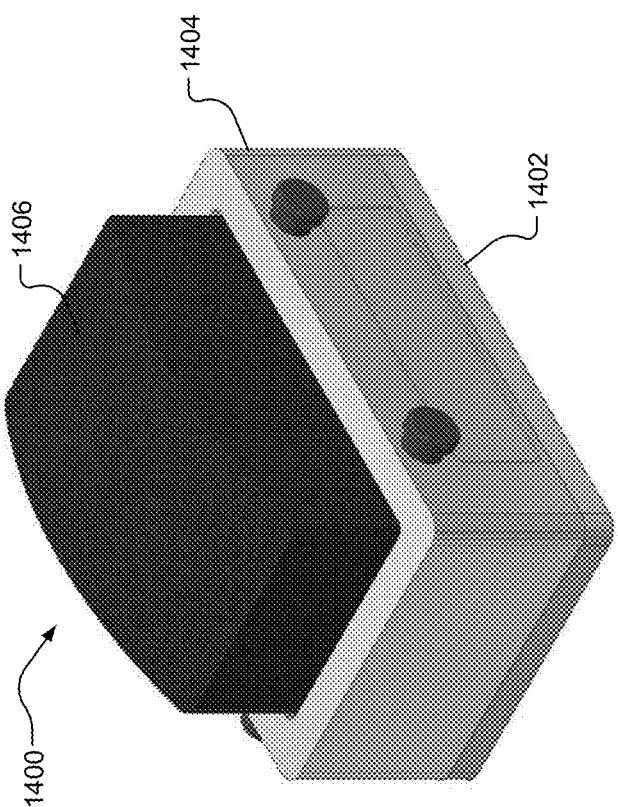
FIG. 14A is a first top perspective view of another secondary bumper assembly including a band and shoulder bolts and mounting holes in accordance with an embodiment of the present disclosure.
Figure 14D:
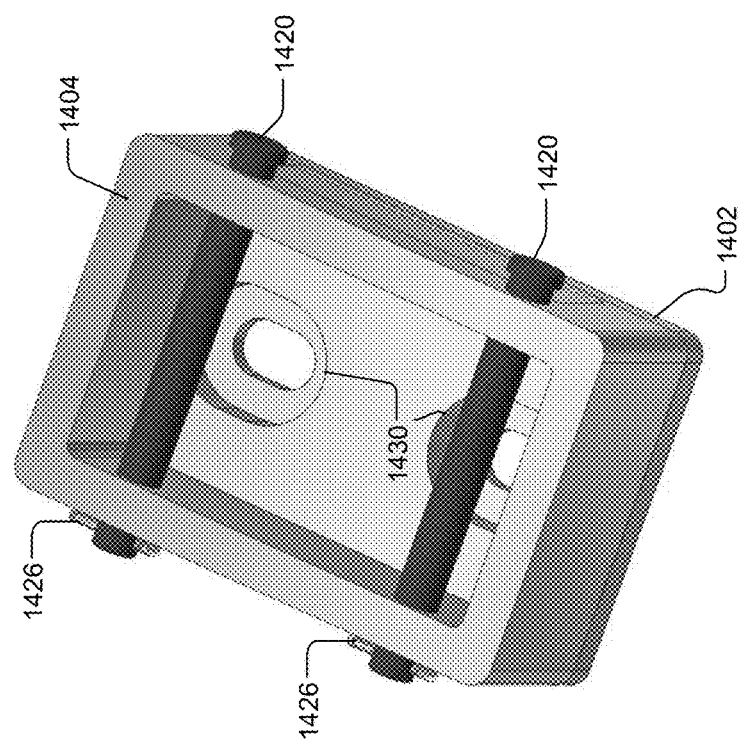
FIG. 14D is a top perspective view of a portion of the secondary bumper assembly of FIG. 14A.
Figure 14C:
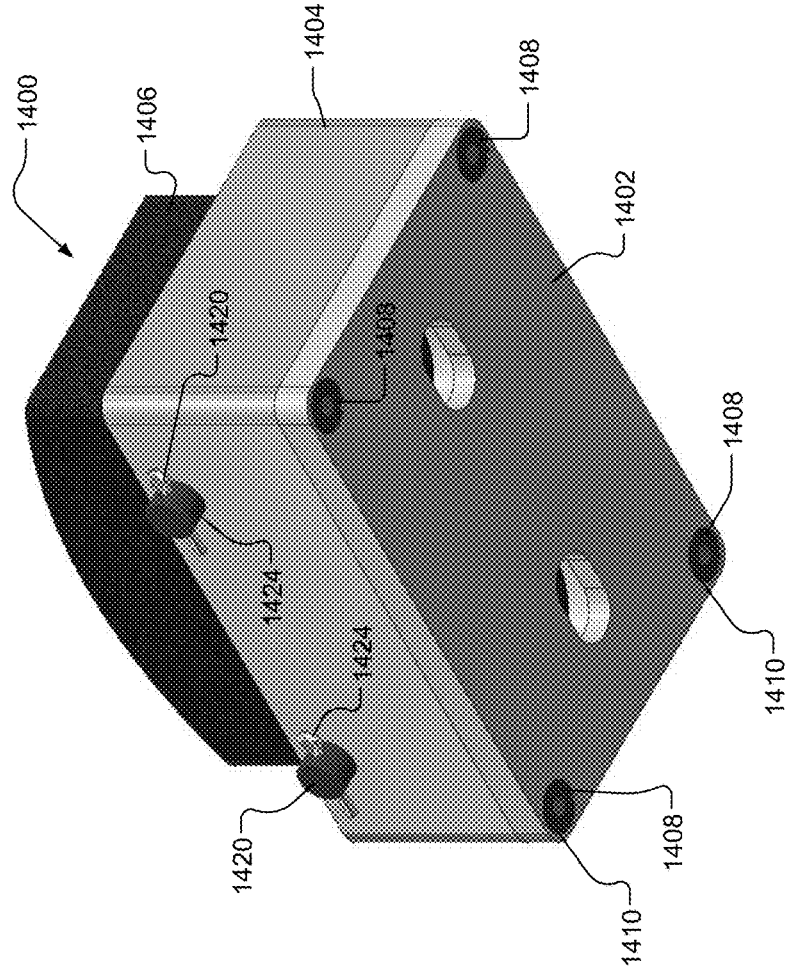
FIG. 14C is a bottom perspective view of the secondary bumper assembly of FIG. 14A.

FIG. 13 shows a portion 1300 of a primary bumper and a secondary bumper assembly 1302. The secondary bumper assembly 1302 includes a base plate 1304 including an integrated groove hold-down heel block 1306 and a removable groove hold-down heel block 1308. The removable groove hold-down heel block 1308 is fastened to the base plate 1304 via fasteners 1310. The heel blocks 1306, 1308 hold a secondary bumper 1312 to the base plate 1304.

The integrated groove hold-down heel block 1306 may have a side 1320 that is flush with a first end 1322 of the base plate 1304. The removable groove hold-down heel block 1308 may be offset from a second end 1324 of the base plate 1304 such that there is a ledge 1326, which provides space to more easily remove the heel block 1308 and the secondary bumper 1312.

To remove the secondary bumper 1312, the fasteners 1310 may be loosened and the removable groove hold-down heel block is slid out of the corresponding groove 1328 of the secondary bumper 1312. The secondary bumper 1312 is then removed from the integrated groove hold-down heel block 1306.

FIG. 14A-D shows a secondary bumper assembly 1400 that includes a base plate 1402 and a band 1404 having four sides that surround a portion of a secondary bumper 1406. The base plate 1402 and the band 1404 form a cup-shaped holding member or two-piece mounting base for holding a base or lower portion of the secondary bumper 1406. The base plate 1402 and the band 1404 may be integrally formed as a single part. The base plate 1402 may be held on to the band 1404 via fasteners 1408, which may extend through counterbored holes 1410 in the base plate 1402 and screw into the band 1404. The secondary bumper 1406 may sit in a pocket formed by the base plate 1402 and the band 1404. Clevis pins 1420 may extend through holes 1422 in the band 1404 and through holes 1424 in the secondary bumper 1406. Cotter pins 1426 may be inserted in ends of the clevis pins 1420 to prevent the clevis pins 1420 from sliding out of the band 1404 and the secondary bumper 1406. The base plate has counterbored holes (or slots) 1430 through which fasteners may be extended to mount the base plate 1402 to a primary bumper.

The secondary bumpers disclosed herein are not configured to be directly mounted to a bumper, such as a primary bumper, and/or any member extending from or attached to the primary bumper without use of groove hold-down heel blocks. This is because the secondary bumpers are void of pass through holes for attaching the secondary bumpers to a bumper using, for example, screws or bolts. The secondary bumper assemblies disclosed herein may be implemented on class 3 or higher vehicles, ambulances, trailers, and/or other vehicles.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A secondary bumper assembly comprising:
    a base plate comprising a plurality of holes for mounting the secondary bumper assembly to a primary bumper of a vehicle;
    a secondary bumper disposed on the base plate, wherein the secondary bumper comprises a main body and a base, wherein a first groove and a second groove exist between portions of the main body and the base, wherein the base has a plurality of base segments; and a first pair of heel blocks comprising flanges and configured to at least one of maintain contact between or at least partially prevent movement between the secondary bumper and the base plate,
wherein
the base segments slide into gaps between the first pair of heel blocks and the base plate,
a hardness level of the base segments is greater than a predetermined level to prevent flexing of the base segments in a direction away from portions of the main body opposite the base segments, and
the flanges slide respectively into the first groove and the second groove.

2. The secondary bumper assembly of claim 1, wherein the vehicle is a class 8 or higher truck and the secondary bumper is configured to dampen a bump event between the vehicle and a loading dock.

3. The secondary bumper assembly of claim 1, wherein at least one of:
the secondary bumper is void of holes for mounting the secondary bumper to the primary bumper; or
the secondary bumper is void of holes for passage of fasteners to mount the secondary bumper to the primary bumper.

4. The secondary bumper assembly of claim 1, wherein the first groove is on an opposite side of the secondary bumper than the second groove.

5. The secondary bumper assembly of claim 4, wherein the first groove and the second groove are connected by a third groove and a fourth groove.

6. The secondary bumper assembly of claim 1, wherein the secondary bumper is void of holes.

7. The secondary bumper assembly of claim 1, wherein the base plate comprises grooves in which the first pair of heel blocks are disposed.

8. The secondary bumper assembly of claim 1, wherein the base plate includes a pocket in which the first pair of heel blocks and the secondary bumper are disposed.

9. The secondary bumper assembly of claim 1, wherein the first pair of heel blocks are integrally formed as part of the base plate.

10. The secondary bumper assembly of claim 1, further comprising a second pair of heel blocks that are disposed in respective holes in the base plate and in respective pockets in the secondary bumper.

11. The secondary bumper assembly of claim 10, further comprising a plurality of fasteners extending through one or more sides of the base plate and into one or more of the second pair of heel blocks.

12. The secondary bumper assembly of claim 1, wherein the secondary bumper has at least one of an arched bumping surface, a double-contoured surface or a flat surface.

13. The secondary bumper assembly of claim 1, wherein the secondary bumper comprises an interior pocket.

14. The secondary bumper assembly of claim 1, further comprising a plurality of fasteners, wherein at least one of:
the plurality of fasteners extend through holes in the first pair of heel blocks and screw into the base plate; or
the plurality of fasteners extend through the base plate and screw into the first pair of heel blocks.

15. The secondary bumper assembly of claim 1, wherein the plurality of holes are disposed outside of the secondary bumper in portions of the base plate extending outward and away from the secondary bumper.

16. The secondary bumper assembly of claim 1, wherein the secondary bumper covers the plurality of holes in the base plate.

17. The secondary bumper assembly of claim 1, further comprising a plurality of fasteners extending through the first pair of heel blocks and into bushings in the secondary bumper.

18. The secondary bumper assembly of claim 1, wherein:
the first pair of heel blocks are configured to be mounted directly to the primary bumper via fasteners and hold the secondary bumper to the primary bumper without use of the base plate; and
the fasteners are configured to extend through the first pair of heel blocks and into at least one of the base plate or the primary bumper.

19. A secondary bumper assembly comprising:
a secondary bumper comprising a main body and a plurality of members, wherein the plurality of members extend from the main body and form a first channel; and
a base plate comprising a plurality of holes for mounting the secondary bumper assembly to a primary bumper of a vehicle,
wherein
the base plate comprises a center member and a bottom retainer plate,
the center member extends longitudinally along the bottom retainer plate and interlocks with the plurality of members, and
the secondary bumper slides over the center member, such that the center member is disposed in the first channel.

20. The secondary bumper assembly of claim 19, wherein the plurality of members extend from a same side of the main body.

21. The secondary bumper assembly of claim 19, wherein the base plate comprises a plurality of sidewalls that extend longitudinally along the bottom retainer plate and retain the plurality of members.

22. The secondary bumper assembly of claim 21, wherein:
the plurality of sidewalls form a plurality of channels with the center member;
the plurality of channels do not include the first channel; and
the plurality of members slide into the plurality of channels.

23. The secondary bumper assembly of claim 22, further comprising a plurality of fasteners, wherein:
the plurality of members include a first plurality of holes;
the sidewalls include a second plurality of holes; and
the plurality of fasteners extend through the first plurality of holes and into the second plurality of holes.

24. The secondary bumper assembly of claim 19, further comprising a plurality of end caps connected to ends of the base plate and retaining the secondary bumper on the center member.

25. A secondary bumper assembly comprising:
a base plate comprising a plurality of holes for mounting the secondary bumper assembly to a primary bumper of a vehicle;
a secondary bumper disposed on the base plate;
a plurality of fasteners; and
at least one of
a band extending around a portion of the secondary bumper, or
a plurality of plates extending from the base plate and into the secondary bumper and at least one of (i) the plurality of plates being in contact with the base plate, (ii) the plurality of fasteners extend through a main body portion of the secondary bumper, or (iii) the base plate has a front surface and a back surface and when the secondary bumper assembly is attached to the primary bumper, the front surface faces the secondary bumper and the back surface faces the primary bumper, wherein the plurality of fasteners extend though the secondary bumper and at least one of the band or the plurality of plates.

26. The secondary bumper assembly of claim 25, comprising the band, wherein the plurality of fasteners extend through the band and retain the secondary bumper on the base plate.

27. The secondary bumper assembly of claim 25, comprising the plurality of plates, wherein the plurality of fasteners extend through the plurality of plates and retain the secondary bumper to the base plate.

28. The secondary bumper assembly of claim 19, wherein the center member interlocks with the plurality of members along a longitudinal length of the center member.

29. The secondary bumper assembly of claim 19, wherein the center member interlocks with the plurality of members such that movement of the secondary bumper in a direction away from the baseplate is prevented.

30. The secondary bumper assembly of claim 19, wherein portions of each of the plurality of members slide in grooves of the center member.

31. The secondary bumper assembly of claim 25, wherein the base plate and the band form a cup in which the secondary bumper is disposed.

32. The secondary bumper assembly of claim 25, wherein:
the plurality of plates are in contact with the base plate;
the plurality of fasteners extend through a main body portion of the secondary bumper; and
the base plate has the front surface and the back surface and when the secondary bumper assembly is attached to the primary bumper, the front surface faces the secondary bumper and the back surface faces the primary bumper.

\* \* \* \* \*